(12) United States Patent
Zink

(10) Patent No.: US 9,657,247 B2
(45) Date of Patent: May 23, 2017

(54) AUXILIARY ACID AND SOUR GAS TREATMENT SYSTEM AND METHOD

(71) Applicant: Donald Lawrence Zink, Billings, MT (US)

(72) Inventor: Donald Lawrence Zink, Billings, MT (US)

(*) Notice: Subject to any disclaimer, the term of this patent is extended or adjusted under 35 U.S.C. 154(b) by 367 days.

(21) Appl. No.: 14/208,824

(22) Filed: Mar. 13, 2014

(65) Prior Publication Data
US 2014/0275693 A1 Sep. 18, 2014

Related U.S. Application Data

(60) Provisional application No. 61/781,357, filed on Mar. 14, 2013.

(51) Int. Cl.
| | | |
|---|---|---|
| *B01D 53/18* | (2006.01) | |
| *C10L 3/10* | (2006.01) | |
| *B01D 53/14* | (2006.01) | |

(52) U.S. Cl.
CPC .......... *C10L 3/102* (2013.01); *B01D 53/1431* (2013.01); *B01D 53/1462* (2013.01); *B01D 53/18* (2013.01); *B01D 2252/103* (2013.01); *B01D 2252/20405* (2013.01); *B01D 2257/304* (2013.01); *B01D 2257/504* (2013.01)

(58) Field of Classification Search
None
See application file for complete search history.

(56) References Cited

U.S. PATENT DOCUMENTS

| | | |
|---|---|---|
| 2002/0012622 A1 | 1/2002 | Frondorf |
| 2003/0084787 A1 | 5/2003 | Hattori et al. |
| 2011/0195006 A1 | 8/2011 | Johnson |
| 2012/0055848 A1 | 3/2012 | Subramaniyam |
| 2012/0078027 A1 | 3/2012 | Dickinson et al. |
| 2013/0284677 A1 | 10/2013 | Snydmiller et al. |

OTHER PUBLICATIONS

Bill Brown, Section 10: Emergency and Standby Power Systems, Mar. 7, 2006, p. 11, Article 701, http://static.schneider-electric.us/assets/consultingengineer/appguidedocs/section10_0307.pdf; accessed Sep. 15, 2014.

*Primary Examiner* — Tam M Nguyen
(74) *Attorney, Agent, or Firm* — Husch Blackwell LLP

(57) ABSTRACT

An auxiliary sour gas treatment system for treating a stream of sour gas during a time wherein a primary gas treatment facility is unavailable, malfunctioning, inadequate or inoperable. The auxiliary sour gas treatment system comprises a lean solvent storage system to store an appreciable volume of a regenerable lean solvent available on demand. A scrubber to treat an influent supply of the sour gas by contacting the sour gas and the lean solvent which chemically or physically binds the contaminants in the sour gas resulting in a cleaned gas suitable for disposal or use as a fuel, and the solvent in an enriched state that contains the removed contaminants. The enriched solvent resulting from treatment may be stored indefinitely in a rich solvent storage system and then regenerated at any convenient time and at any convenient rate or place to remove the contaminants from the rich solvent.

22 Claims, 5 Drawing Sheets

AUXILIARY ACID AND SOUR GAS TREATMENT SYSTEM AND METHOD

CROSS-REFERENCE TO RELATED APPLICATIONS

This application claims the benefit of U.S. Provisional Patent Application No. 61/781,357, filed Mar. 14, 2013, the entire disclosure of which is hereby incorporated by reference.

BACKGROUND OF THE INVENTION

Field of the Invention

The present invention is in the field of oil and gas refining and, particularly, the processing of sour natural gas and/or sour or acid gas by-products of an oil or natural gas refinery by a primary gas treatment facility and more particularly, in utilizing an auxiliary gas treatment system to manage flare emissions for mitigation of pollution and compliance with emission limitations.

Description of Related Art

When crude oil or sour natural gas is extracted from the ground, it must be refined to deliver a commercially distributable fuel and/or other products. Oil and gas refining typically involves several steps including the generation or production of waste gas and safe disposal of the same. If crude oil or harvested natural gas contains significant amounts of sulfur compounds, it is called "sour oil" or "sour gas." The sulfur compounds and other contaminants must be removed from the commercially produced products and the waste gases then include these unwanted contaminants. Many refineries flare off combustible waste gases because they are too volatile to store and transport for future use, and because flaring is a highly reliable methodology for safe disposal of the waste gas. However, because the waste gas may contain harmful or unwanted contaminants, treatment of the waste gas often includes removing contaminants to render them more suitable for disposal or otherwise useful. Common waste gas contaminants include sulfur compounds, primarily hydrogen sulfide, and carbon dioxide.

Waste gas that includes significant hydrogen sulfide is referred to as "sour gas". Because waste gases that include hydrogen sulfide and/or carbon dioxide also form corrosive acids when combined with moisture, the more concentrated of these gases are also commonly referred to as "acid gas." Accordingly, these hydrogen sulfide bearing gases will be referred to collectively herein as "sour gas" throughout this description, and the use of "sour gas" herein is intended to include any gases that include both high and low concentrations of acidic sulfur compounds, carbon dioxide, and/or other contaminants now known or hereafter discovered to behave similarly.

Refineries typically include primary gas treatment facilities which may include treating sour gases in "amine units" or gas sweetening units which produce a stream of acid or sour gas (enriched in hydrogen sulfide) and a stream of desulfurized fuel or product gases, typically hydrocarbons, largely depleted of hydrogen sulfide. These amine-based product gas treating units today are typically upstream of "sulfur recovery facilities" that further treat enriched sour gases prior to disposal. Often, the sulfur recovery facility also includes an amine-based gas treating unit as well serving to treat tail gases. The primary gas treatment facilities, including amine units operate more or less continuously and typically include an absorber, a regeneration system comprising heat exchangers, a reboiler, and a stripping column and normally make use of pumps to continuously circulate solvent back and forth between the absorber and the regeneration system. Such primary gas treatment facilities require power, steam, electricity and other industrial utilities to operate properly. Due to emissions limitations regulating sulfur dioxide and hydrogen sulfide, primary gas treatment facilities also require the continuous, simultaneous availability of a downstream sulfur recovery plant (or equivalent) to process the hydrogen sulfide captured and render it harmless. Primary gas treatment facilities or systems may also be incapable of treating their current supply of sour gas or subject to malfunction. At times, the produced enriched sour gases become suddenly and/or highly contaminated with hydrocarbons or amine or both and therefore, a chemical property of the downstream enriched sour gas product becomes out of specification or has variances which render such sour gas stream suddenly unsuitable for processing in a sulfur recovery plant or other gas treatment facility. Primary gas treatment facilities may also be incapable of processing a supply of sour gas or may malfunction when material properties of the gas are out of specification or include variances in the material properties which render the sour gas produced unsuitable for processing in a sulfur recovery plant or other primary gas treatment facility. Such material properties may include temperature, mass flow of sulfur compounds or other chemicals including hydrocarbons and amines, or any other material property now known or hereafter monitored. Primary gas treatment facilities or systems are sometimes incapable of processing a supply of sour gas when a chemical or material property has variances which suddenly fluctuate from one value to another, even in cases when the overall property may be within the nominal specification of the gas treatment facility or system. For example, a sulfur recovery plant in a gas treatment facility or system may be capable of treating a supply of sour gas contaminated with a range from one-half percent to five percent hydrocarbon content. Nevertheless, such a primary gas treatment facility may be incapable of treating a supply of gas that either (1) exceeds the treatable limit of hydrocarbon concentration of five percent or (2) has excessive variances in the mass flow of hydrocarbon contained in the supply of sour gas even if the hydrocarbon content is under the five percent limit.

Refineries may implement "flare gas recovery systems" if the waste gas is a sour gas in order to treat flare gases prior to being flared, and in order to recover fuel values in the gases. Flare recovery systems generally extract gases from the flare system using compression and subject the compressed sour gases to pretreatment to remove sulfur compounds and other contaminants in order to meet quality or regulatory emissions standards. Such flare gas systems as presently implemented, however, invariably depend on the immediate and simultaneous availability of adequate downstream equipment to (a) selectively remove the sulfur compounds, (b) immediately regenerate the selective reagent, and (c) immediately treat the removed compounds, typically by conversion to elemental sulfur, prior to use of the recovered gases or prior to disposal of the remaining gases to flare. In a few special cases the "recovered" flare gases are treated with non-regenerable reagents (such as caustic soda or ammonia) but these processes and reagents are costly, involve hazardous reagents, and produce hazardous waste stream(s) requiring generally costly disposal.

The sour gas combustible waste gases produced by refineries contain hydrogen sulfide which must be removed due to the highly regulated combustion products produced if hydrogen sulfide is flared without treatment. Hydrogen sulfide itself is malodorous, highly toxic and flammable, and is not readily stored because of its high vapor pressure, variable composition, and the threat it poses as an air-toxic and an explosion hazard. Further, because of transportation, environmental and other safety constraints, it has little or no commercial market, and is not easily stored as a compressed gas or liquefied gas. Accordingly, a supply of sour gas requires immediate processing and continuous treatment in order to prevent potential harmful effects to people and/or the environment due to the hydrogen sulfide.

Flare recovery systems to date have generally been completed by primary gas treatment facilities that receive the stream of the combustible flare recovery gas waste along with sour fuel gases also continuously produced from the continuous operation of the upstream oil or natural gas refinery. These gases are typically desulfurized in the facility's amine gas treating unit(s), and the enriched product sour gas is then sent for immediate processing in the downstream sulfur recovery plant serving the facility. FIG. 1 illustrates an embodiment of a downstream primary sour gas treatment facility 100 that is commonly used in the present industry. Primary sour gas treatment facility 100 receives the enriched sour gas stream from the upstream refinery amine gas treating units 101, such as a fuel gas, natural gas, or other sour gas treatment facility, and sour water units through an influent pipe 102, performs pretreatment if necessary to remove excess hydrocarbons and typically commercially produces elemental sulfur 105 in a Sulfur Recovery Unit ("SRU") 104 as a by-product of the treatment and processing of the sour gas. In its elemental foam, sulfur 105 is a non-toxic liquid and solid material which is readily stored, transported, and consumed in vast quantities in the production of other products for which there is an adequate market, such as fertilizer and other consumer and industrial products.

SRU 104 may and generally does utilize the well-known multi-stage Claus recovery process to partially oxidize the hydrogen sulfide in the sour gas and remove up to around ninety-seven percent (97%) of the sulfur initially present in the sour gas. The Claus process typically utilizes a thermal reactor stage and two or more catalytic reactor stages in series, and (when receiving good quality gas feed) recovers the elemental sulfur as a molten liquid of high purity. Both the process and the product quality can be damaged if the feed gases become highly contaminated with hydrocarbons in a malfunction. While highly efficient, the Claus process does not remove all sulfur or sulfur compounds from the sour gas, therefore, the gas exiting SRU 104 is called "tail gas" and includes the remaining hydrogen sulfide, sulfur vapors and mists, other toxic sulfur compounds at low concentrations and other contaminants including carbon dioxide, nitrogen, and water vapor which make up most of the typical tail gas. Thus, the treatment and processing of the influent sour gas also typically involves being output through a pipe 106 and into a complex tail-gas treatment unit 108 to substantially remove the remainder of the sulfur content from the sour gas prior to the depleted tail gas being vented or incinerated. The tail-gas treatment unit 108 is used to minimize the emissions of sulfur dioxide and hydrogen sulfide and to meet current regulatory emissions standards for such SRU's. Further, both the Claus and tail-gas treatment units are highly sensitive to damage by gases with excessive and rapidly changing non-sulfur contamination, such as hydrocarbons.

FIG. 1 also illustrates a general schematic of typical tail-gas treatment unit 108 of a primary sour gas treatment facility 100. The tail gas may be heated by heater 110 to bring it up to a temperature more conducive for reactions. After being heated, the tail gas proceeds through piping 112 to the hydrogenation/hydrolysis reactor 114 wherein most all sulfur and its compounds in the tail gas are converted to hydrogen sulfide through a known catalytic process using hydrogen gas. The tail gas now containing its sulfur content as hydrogen sulfide travels through piping 116 to a condenser 118 which cools the gas to remove water vapor. Recovered water is piped out pipe 120 and may be treated before discharge. At this point, the tail gas treatment unit begins to resemble an amine unit used for treating fuel gases. The cooled, de-watered tail gas flows out of condenser 118 through piping 122 to an absorber 124.

The tail gas travels through absorber 124 wherein the tail gas contacts and reacts with a lean solvent which is known to persons in the art to selectively absorb hydrogen sulfide to remove sulfur from the tail gas. The lean solvent is introduced into absorber 124 through lean solvent inflow pipe 126. The lean solvent is then placed into contact to interact with the tail gas, thereby scrubbing the hydrogen sulfide therefrom. Lean solvents for such purposes are known in the art and commonly used in absorbers in tail gas conversion processes. Such solvents are generally selected to largely reject carbon dioxide absorption in order to prevent carbon dioxide buildup in the overall sulfur recovery scheme. Once the lean solvent reacts with the hydrogen sulfide, it is then in a "rich", "semi-rich" or "semi-lean" state wherein it contains the hydrogen sulfide removed from the sour gas through absorption, adsorption, dissolution, or due to any other chemical suspension or reaction. Once the hydrogen sulfide is removed from the tail gas, the cleaned gas exits absorber 124 through a vent gas pipe 128 to an incinerator 130 where it is normally oxidized to remove odorous compounds prior to disposal of the cleaned waste gas stream to atmosphere, typically at a stack. The tail-gas treatment unit 108 may include a method to capture the heating capacity of exiting cleaned tail gas to be used as energy in the treatment facility. In some cases, the depleted tail gas is not incinerated and is simply vented.

The rich solvent exits absorber 124 through a rich solvent out pipe 132 and is conveyed to a solvent regenerator 134 wherein the hydrogen sulfide is removed from the rich solvent. The process of regeneration typically includes the rich solvent being preheated by indirect heat exchange with the lean solvent leaving reboiler 136 and/or then processed in a reboiled regenerator 134 where the absorbed sour gases are stripped from the aqueous solvent solution by introduction of heat and/or steam from the reboiler/steam generator 136. The regenerated hydrogen sulfide gas exits the regenerator as an enriched sour gas through return pipe 138 wherein the regenerated sour gas is cooled and conveyed back to be combined with the influent gas in influent line 102 to be re-processed through SRU 104. The regenerated lean solvent returns to absorber 124 through pipe 126 as shown, generally exchanging its heat with incoming rich solvent. The piping and transfer of gas and fluid through the downstream tail-gas treatment unit 108 may be accomplished through a number of piping configurations, valves and/or pumps positioned to move the products and by-products through the system as will be appreciated by a person of skill in the art. There are, of course, other variant tail gas treatment processes, some of which do not involve the production of hydrogen sulfide, or even the production of sulfur, but the majority of installations in the United States use a process similar to the above. In each case, however, these tail gas treatment processes, from time to time, must go offline for repair or to address process upsets, and most are highly complex. In such cases of equipment going offline or to a state of reduced capacity, any excess of the continuous stream of incoming sour gas to the sulfur recovery plant (or its equivalent) has no place to go except to flare.

Tail-gas treatment unit 108 may include a known amine unit. While primary sour gas treatment facility 100 including tail-gas treatment unit 108 is commonly used in the art downstream of a refinery sulfur plant, other amine-based primary gas treatment facilities are also frequently implemented at refineries which function similarly to tail gas treatment unit 108 described above, for example in desulfurizing sour fuel gases and generating enriched sour gas feed for a sulfur recovery plant and its associated tail gas treatment unit. In addition to the SRU 104 and tail gas treatment unit 108 of primary sour gas facility 100, the term "primary gas treatment facility" and "primary gas treatment system" as used herein shall also refer to any other amine-based gas treatment facilities or systems now known or hereafter developed to treat sour gases including, but not limited to a sour fuel gas treatment facility or system, a sour natural gas treatment facility system, a primary sour gas treatment system including a sulfur recovery unit, and a tail gas treatment facility.

These known primary gas treatment facilities must be taken off-line, or are forced to shut-down or slow down for periods of time and are temporarily inadequate for the incoming sour gas supply demand for any one of a number of circumstances. As shown in FIG. 1, the method currently used by such gas treatment facilities during such periods of inadequacy is to operate by-pass valve 140 to direct some or all of the influent gas from the upstream refinery through bypass pipe 142 directly to flare tower 130 wherein the sour gas is combusted without being treated and the potentially harmful by-products, sulfur dioxide and any unburned hydrogen sulfide, are emitted into the atmosphere.

These primary sour gas treatment facilities, while well developed, are complex, multistage technologies, typically involving tens of millions of dollars in capital equipment, requiring continuous supplies of utilities, and skillful operation. They are typically subject to strict emission limitations, for example, for the control of sulfur dioxide and hydrogen sulfide emissions. However, much like any mechanical system, the primary sour gas treatment facility equipment requires repair and maintenance which often cannot be carried out while the process is running. Thus, situations inevitably arise, sometimes without notice, in which primary sour gas treatment facility's 100 processing capacity is limited or not available, while upstream sour gas production cannot be simultaneously or instantly halted. Examples of events in which treatment by primary gas treatment facilities may become interrupted include without limitation: power failures, cooling failures, fires, explosions, contaminated feeds unsuitable for processing in the sulfur plant, essential repairs, plugging or fouling of downstream equipment, imbalances between produced gases and downstream capacity, surges, startups, shutdowns, process upsets and so on.

When the upstream facility is still producing and supplying sour gas and the primary sour gas treatment facility is shut-down or limited for any reason, the upstream refinery processes or the primary sour gas sulfur treatment facilities typically address these situations by using one or more of the following techniques: flaring the excess gases, shutdown or curtailment of upstream production, and/or parallel or redundant equipment in the amine units, the sulfur plant and the tail gas plant, and/or emergency power and emergency cooling or both. These methods each have substantial shortcomings, particularly in view of processing economy and stricter environmental standards.

Redundant or excess processing equipment adds to the equipment cost and the equipment complexity, and is an extremely inefficient use of resources because the excess equipment is unused and subject to degradation during normal operation of the primary sour gas treatment facility. Furthermore, redundant equipment simply cannot address cases where the incoming feed becomes so far out of specification that it cannot be safely processed in a Claus plant (or equivalent) or any downstream tail gas treatment unit. Moreover, redundant or excess processing equipment has an increased vulnerability to corrosion and breakdown itself because it is occasionally exposed to the sour gas, but is not constantly used to prevent exposure to oxygen and other corrosive conditions. Sour gas and intermediate compounds from its processing may be extremely corrosive and if the gas and its derivatives are left in the idle equipment, even in trace amounts, and combine with the oxygen in the atmosphere, the result is extremely corrosive. Further, being similarly complicated to the primary treatment process, the redundant or excess processing equipment likely will not be immediately available for instant service when actually needed, particularly for unplanned events such as, for example, malfunction in upstream equipment, a power outage, operator error, or the plugging or fouling of downstream equipment. Such equipment must be carefully started, generally over a period of hours or even days, in order to prevent damage.

Similarly, slowing down or stopping the upstream refinery is slow and very inefficient and unnecessarily exposes the upstream refinery to risks of accidents or some other risk. The start-up and shut-down of the refinery is among the most dangerous of the refinery operations. At that time, the hazardous components are at their most unknown and variable conditions and the process is the most dynamic and uncontrolled and the sour gas produced during start-up or shut-down often have properties and variances that are out of specification for treatment in a primary gas treatment system. Moreover, interfering with the production of the upstream refinery causes variations in production that have adverse financial and product quality consequences on the producer and, potentially, on the consuming public and should be avoided whenever possible.

If a primary gas treatment facility does not have redundant downstream processing equipment instantly available and the upstream refinery does not instantly shutdown, then the flaring of excess hydrogen sulfide containing gases necessarily occurs whenever there is an imbalance between the upstream demand and the downstream processing capability. Flaring technology has been safely used for over one-hundred years to burn off refining by-products and is the industry standard because it is highly effective, simple, and highly immune to damage and overload. Further, flaring is not necessarily dependent on any other utilities, such as electricity or cooling. However, even when only used in an emergency situation, flaring diverted sour gas has raised increased environmental regulation scrutiny due to the associated emissions of sulfur dioxide and hydrogen sulfide. Further, the release of sulfur dioxide into the air, even in necessary amounts during emergencies is being increasingly restricted, foreclosing responsible use of flaring for handling sour gases. Governmental regulations increasingly restrict the emissions of sulfur dioxide and hydrogen sulfide, including those arising in emergency flaring.

Thus, there is a need in the art for an auxiliary sour gas treatment system to be used separately from or integrated into a primary sour gas treatment facility that eliminates flaring untreated acid waste gas whenever there is an imbalance between the demand of the sour gas supply and the primary sour gas treatment facility's processing capability for compliance with emission limitations. This includes overloading of the gas treatment facility at peak production times, a sour gas supply out of specification, a shut-down of the downstream plant for repairs, controlled startup following repairs, outages in regeneration equipment and/or downstream (sulfur) recovery equipment, or an emergency shut-down to a malfunction, power outage or other interruption in utilities. A simple and cost-effective auxiliary treatment system is particularly needed when this imbalance is of a short term nature and finite in duration, as is often the case.

SUMMARY OF THE INVENTION

The present invention is directed to a reliable, instantly or quickly available auxiliary gas processing system to minimize flaring emissions of sulfur dioxide or other hazardous materials, utilizing selective regenerable "solvents" or reagents, conveying equipment, contacting equipment, storage equipment, and solvent regeneration equipment when necessary or convenient to manage treatment of sour gases to accommodate capacity schedules and outages in a primary gas treatment system, facility or its regeneration equipment and/or in an associated downstream (sulfur) recovery equipment for compliance with emission limitations, service goals, and/or product quality constraints. Notably, the primary regeneration and primary gas treatment facilities may, but need not, be operational simultaneously with the present auxiliary sour gas treatment system and/or other flare minimization stages of the process, and the regeneration of the solvent used and stored by the present auxiliary system may be delayed indefinitely. The term "primary gas treatment facility" as used herein shall also refer to any other amine-unit gas treatment facilities now known or hereafter developed to treat sour gases including, but not limited to a sour fuel gas treatment facility, a sour natural gas treatment facility, a sulfur recovery unit, and a tail gas treatment facility.

The present auxiliary sour gas treatment system includes receiving a supply of sour gas from an upstream gas treatment facility, scrubbing the sour gas with a solvent that has been stored in advance in a lean state (also referred to herein as "lean solvent"), wherein the solvent chemically or physically binds the contaminant in the solvent such that the solvent is in a rich state (also referred to herein as "rich solvent" or "semi-lean" solvent), passively storing at least some of the rich solvent until its regeneration is convenient, regenerating the rich solvent by removing the sulfur content from the solvent as enriched sour gas and, finally, processing the reconstituted sour gas using one of the SRU of the primary gas treatment facility, directing it to an acid gas geo injection plant, and any other known processing method. The sour gas directed to the auxiliary system may typically have a concentration of one one-hundred-thousandth of one percent to one-hundred percent (0.00001%-100%) contaminants and may be supplied at high (>200 psia), moderate (50-200 psia) or, more typically, low (near atmospheric to 50 psia) pressure, depending on the nature of the stream. With larger volumes of solvent, processing may occur at very low absolute pressures, limited by the vapor pressure of the solvent and the vapor pressure of hydrogen sulfide above the rich solvent. The step of processing or regenerating the rich solvent to transform it back into lean solvent may be performed using a stand-alone, dedicated regenerator on-site or off-site or, more advantageously, by linking the rich solvent storage tanks to the same primary regenerator used in the gas treatment facility wherein the rich solvent is regenerated at such time when the gas treatment facility again has unused processing capacity.

The present auxiliary system uses regenerable solvents, produces no significant new wastes or "products" requiring disposition other than as normally carried out at a facility plant or other gas processing stations. The present auxiliary system, like the sour gas flaring it replaces, is highly tolerant of the dynamic and often unknown changes in composition and flow characteristic of malfunctions, startups and shutdowns, and of gases that are temporarily unsuitable for processing in the primary systems, and can readily be made highly tolerant of occasional interruptions in primary utilities. This capability to process upset and dynamic conditions is unlike the typical primary gas treatment facility that it supports. The system of the present invention provides a primary gas treatment facility the ability to avoid flaring untreated sour gas when there are occasional, sudden or periodic mismatches between upstream processing demand and downstream processing capability or capacity of the primary sour gas treatment facility. Examples of common mismatches in processing demand and downstream processing capability of the primary sour gas treatment facility include: cases where downstream equipment is unavailable due to breakdown, power failure, or repair needs, during startup and shutdown periods, in situations where the sour gas has deviated too far from normal specifications for safe treatment in the primary sulfur recovery equipment, or where downstream capability is limited due to capacity constraints.

The present auxiliary system may be used to treat sour gas prior to flaring when the primary gas treatment facility is partially or fully offline or inoperable, when such primary system or the refinery itself is starting up or shutting down, or where the feed is inappropriate for the gas treatment facility, such as during an upstream malfunction. In addition, the present auxiliary system may be used to smooth the processing load to better match downstream processing capabilities and capacity of the primary sour gas treatment system with upstream demand surges, thereby minimizing flare emissions and associated waste gases. Further, the auxiliary system of the present invention may be implemented to promote the overall operating efficiency of a primary gas treatment facility, and reduce the necessary capital for such facilities by smoothing the demand, and reducing the size of and in some cases the need for complex redundant systems. The invention is also applicable to natural gas production flaring, particularly as means to clean sour natural gases prior to flaring or for recovery as a fuel source. If it is more economical for the regeneration of the solvent to be carried out at a site remote from the gas wells and primary refinery location, the lean and/or rich solvent may be transported by pipe, water transport, rail or truck between the auxiliary sour gas treatment system and a remotely located solvent regeneration facility.

Other aspects and advantages of the present invention will be apparent from the following detailed description of the preferred embodiments and the accompanying drawing figures.

BRIEF DESCRIPTION OF THE SEVERAL VIEWS OF THE DRAWING

The accompanying drawings form a part of the specification and are to be read in conjunction therewith, in which like reference numerals are employed to indicate like or similar parts in the various views.

DETAILED DESCRIPTION OF THE INVENTION

Figure 1:
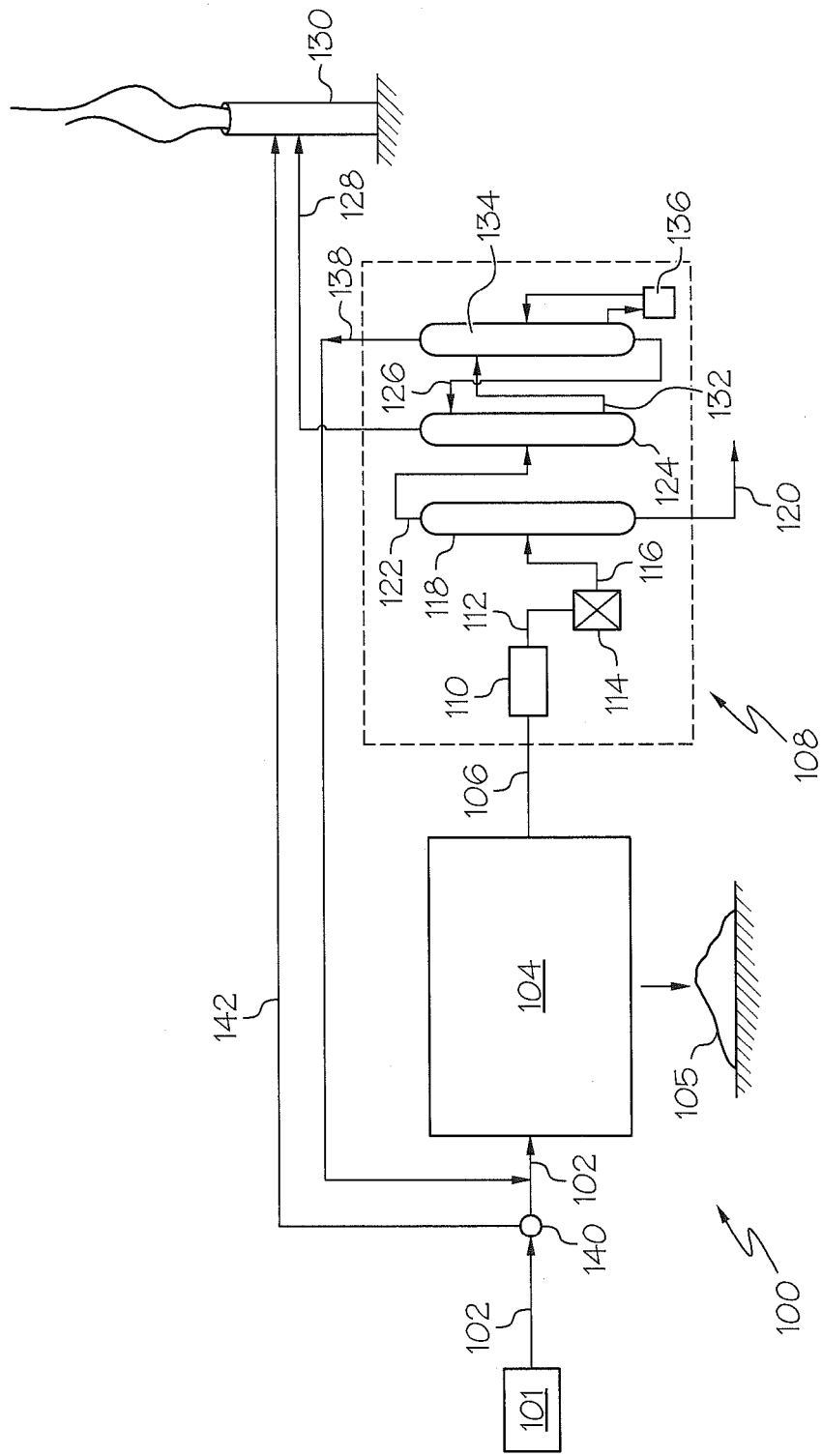
FIG. 1 is a schematic view of one embodiment of an existing primary sour gas treatment facility as known in the art.

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

The present invention mitigates and/or prevents sulfur dioxide and hydrogen sulfide emissions from being introduced into the atmosphere through flaring untreated sour gas during a triggering event through a simple, scalable process which may be passive or active and that is readily installed and integrated into a primary gas treatment facility, whether new or existing, and which may be readily protected from significant interruption in necessary utilities or other problems impairing the primary plant during a triggering event. Moreover, the present auxiliary sour gas treatment system may be utilized to provide temporary or excess sulfur removal from the influent flow of sour gas from an upstream refinery during a triggering event. In general, a triggering event is any time the upstream supply of sour gas requiring treatment is greater than the instantly available treatment capacity of the primary sour gas treatment facility. The triggering event may be of finite duration. Examples of a triggering event include: a power or utility outage at the primary treatment facility which all facilities inevitably suffer during their operable lifetimes, a shut-down of all or part of the primary gas treatment facility for maintenance or replacement of parts, unsafe deviations from normal sour gas specifications unsuitable for normal processing in a primary gas treatment facility (including its sulfur recovery plant), or an excess of sour gas supply during startup, shutdown, upset or durations of increased or erratic refinery output. A triggering event may also be when the chemical and/or material properties of the supply of sour gas are outside the effective treatable limits of a primary gas treatment facility or system, or when the chemical and/or material properties of the sour gas supply have variances and the variances fluctuate outside a range in which the primary gas treatment facility is capable of processing. A triggering event may further include a situation wherein a refinery or natural gas site lacks immediate access to a primary sour gas treatment facility, such as the refinery or site being located in a remote area, or being newly constructed, and wherein a linked primary sour gas treatment facility does not exist or hasn't been constructed. Further, a triggering event shall also include an operator's decision to divert the supply of sour gas to the present auxiliary sour gas treatment system upon the knowledge or the risk of a pending triggering event or in anticipation of one of the triggering events otherwise described herein. However, the above list of triggering events is not intended to be exhaustive or limiting and those versed in the art will readily see adaptations of the invention to a variety of special circumstances in other situations and other "triggering events." The process described herein may also be applicable to treat other hazardous gases using appropriate known solvents.

Figure 2:
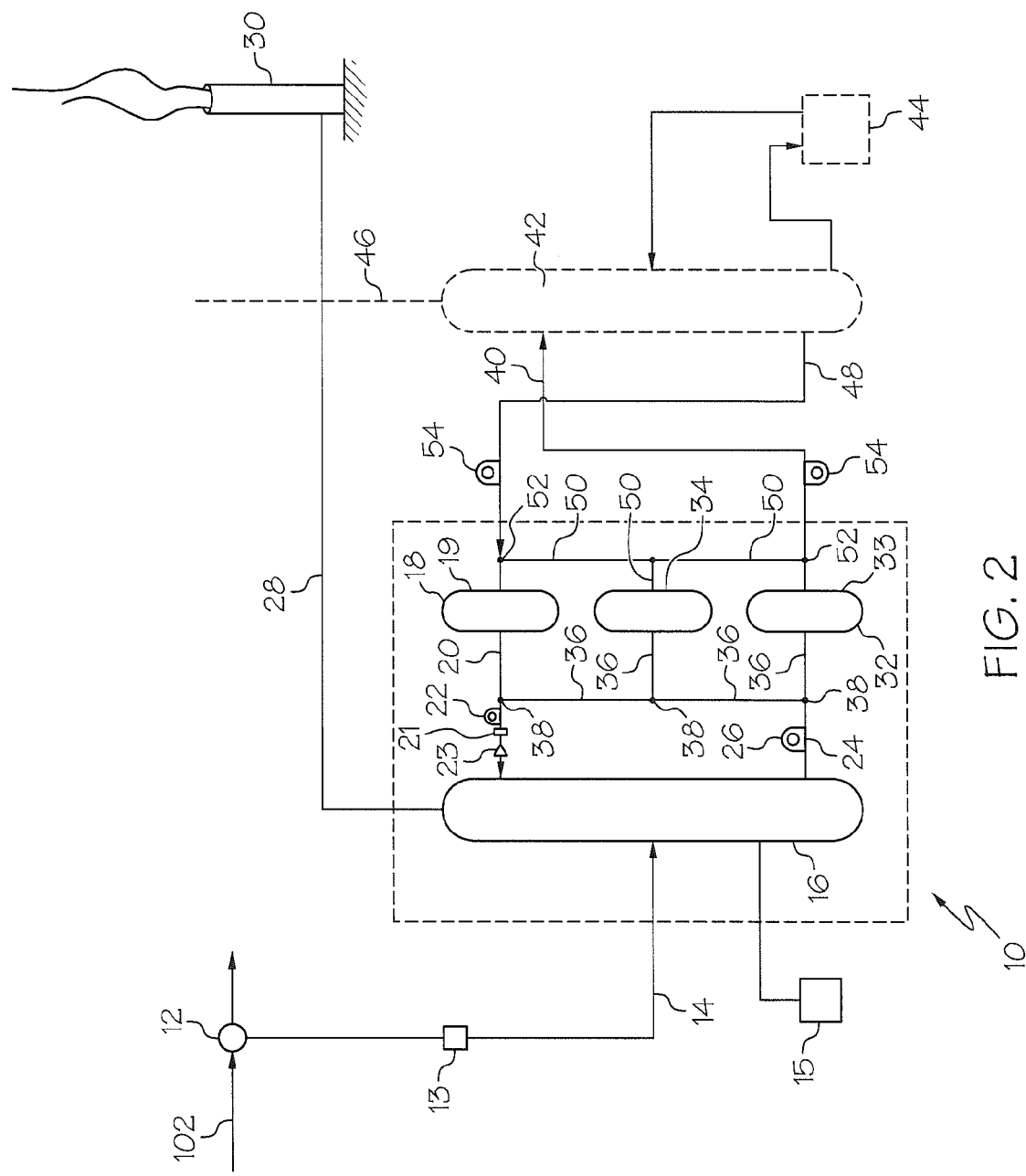
FIG. 2 is a schematic view of one embodiment of the present auxiliary sour gas treatment system in accordance with the teachings of the present invention.

As shown in FIG. 2, the auxiliary sour gas treatment system 10 of the present invention includes scrubbing an influent sour gas. A supply of sour gas from the upstream supply in line 102 or a portion thereof is diverted by means of a by-pass valve 12 through influent piping 14 to a scrubber 16. A gas flow-meter 13 may be included in line 14 for system monitoring, triggering and control. Scrubber 16 may be separate from the primary scrubber(s) at the primary gas treatment facility (e.g. the fuel gas scrubber or tail gas scrubbers) used for ordinary processing of sour gases (see 124 in FIG. 1). If separate, it provides system redundancy, and thereby provides additional scrubbing capacity to the primary sour gas treatment system and/or provides the functional capacity to operate at unusually low pressures or with severely contaminated waste streams.

Scrubber 16 is supplied with a selected solvent in a "lean" state also referred to as "lean solvent." The lean solvent is stored in a lean storage system 18, which may be one or more tanks. In one embodiment shown in FIG. 2, the lean solvent is stored in at least a first storage tank 19. The lean solvent is delivered from storage tank 19 to scrubber 16 through a solvent delivery system comprised of solvent inflow pipe 20 and may be conveyed by a solvent inflow pump (or lean pump) 22. The lean pump 22 may be fixed or variable speed. In one embodiment, a flow meter 21 may be used to monitor and control the flow of solvent into scrubber 16 as shown in FIG. 2. A standby power source (not shown) may be used to assure power for the operation of lean pump 22.

Scrubber 16 may be a multistage scrubbing tower, equipped with trays or packing for countercurrent flow of solvent and sour gases. Scrubber 16 is typically designed for moderate pressure, and may be equipped with a back pressure control system (not shown) controlling the tower pressure and flow of scrubbed gas to the downstream flare system 30 or 130 or other downstream gas user. A reverse jet or venturi scrubber may be used at somewhat different efficiency in place of or ahead of the scrubbing tower. Suitable lean solvent pressure may be provided by simple pumps, by storage at elevation, or by storing the solvent under positive pressure. Scrubber 16 may be any scrubber configuration now known or hereafter developed in the art.

The solvent may be any solvent now known or hereafter developed for use in removing sulfur compounds or other contaminants from sour gas or other refining waste gases, particularly, selective regenerable solvents used for separation of hydrogen sulfide gas from other gases. The solvent is selected for its ability to chemically or physically bind the desired component(s) at available pressure, which may be near atmospheric pressure or such other pressures as the upstream flow can sustain, and for its ability to reject gases suitable for flaring disposal or other uses, such as hydrocarbons. Further, one or more individual solvents may be combined or mixed to provide all of the desired qualities. Moreover, the solvent can be selected to absorb, adsorb, dissolve, or otherwise chemically react with the contaminants or sulfur compounds in the sour gas. One embodiment of the system utilizes an amine solvent, such as monoethanolamine (MEA), methyldiethanolamine (MDEA), or diethanolamine (DEA) solution in water. MEA and MDEA solutions are particularly suitable for absorption of hydrogen sulfide at low pressures, and suitable solutions are highly freeze resistant. MEA solutions at effective concentrations have a low affinity for undesired dissolution of hydrocarbons, have high affinity for hydrogen sulfide compared to other amines, and are suitable for reclamation by distillation. MEA solutions also have high affinity for carbon dioxide (a greenhouse gas), where its recovery is desired or is not objectionable. DEA is a commonly used refinery solvent, which also may perform well, if slightly higher absorber pressures or slightly lower absorber efficiencies are tolerable. DEA is less corrosive to carbon steel than MEA, and has lower affinity for carbon dioxide, which may increase system and storage system capacity. MDEA, has low affinity for carbon dioxide, is of low corrosivity to carbon steel, but has a higher affinity for hydrocarbon dissolution and is of higher cost of purchase. Diisopropylamine (DIPA) and diglycolamine (DGA) are other amines known in the art to be applicable in this process, particularly in low pressure conditions.

Other amines, including secondary amines and tertiary amines may be used, particularly because the tertiary amines are known to have higher selectivity toward hydrogen sulfide as compared to carbon dioxide. In the present auxiliary sour gas treatment system 10, the type of solvent selected for use may be the same solvent that is already in routine use at the primary sour gas facility 100, other gas treatment facilities on the site, or at a remote regeneration site. Therefore, the solvent can be disposed at its end of life in the same manner as the solvent already in used, thus presenting no new disposal problems, and only trivially small incremental disposal volumes ultimately over the life of the facility. Further, if the primary facility changes its "normal" solvent, the system can also generally accommodate the change so that both systems use the same solvent. This facilitates use of already-existing solvent regeneration facilities and personnel for processing the solvent to be used in the auxiliary and primary systems and may result in substantial capital and operating cost savings and low incremental system complexity. Those familiar with the art will readily appreciate the commercial advantages of using a solvent already selected for use for other purposes at a given site, and the advantages of employing idle capacity in existing equipment.

The lean solvent reacts with the sour gas in scrubber 16 wherein the solvent chemically or physically binds the contaminants and thereby is in a rich or an enriched state, also referred to as "rich solvent." The rich solvent is removed from scrubber 16 through a solvent-outflow pipe 24 to a solvent storage system 32. The rate of removal of solvent may be advantageously controlled by a level sensing instrument (not shown) on vessel 16. The removal of the rich solvent out of scrubber 16 may be due to gravity, intrinsic pressure, or by means of an outflow pump (or rich pump) 26. Such outflow pump may be readily provided with back-up power. The scrubbed gases exit scrubber 16 through a pipe 28, typically at low pressure, and then are conveyed to the facility flare 30 (or other sink) where they are safely used or disposed. After being scrubbed, the treated gases have significantly reduced sulfur content and, therefore, the present auxiliary system 10 controls and abates sulfur dioxide and hydrogen sulfide emissions otherwise arising from sour gas flaring during periods when the primary gas treatment facility is off-line or operating at a reduced capacity, the sour gas is out of specification, or other triggering event. Of course, the scrubbed gases may be captured and used for many other purposes, such as a low-sulfur fuel in situations to provide energy for the primary facility or other location, or for any other conceivable purpose.

The present auxiliary sour gas treatment system 10 includes lean solvent storage system 18 and rich solvent storage system 32. Lean solvent storage system 18 stores lean solvent in a condition so that the lean solvent is immediately available on demand to treat the influent sour gas upon the occurrence of a triggering event. As shown in the embodiment of FIG. 2, the lean solvent may be stored in first storage tank 19 so that it can be used on demand in scrubber 16. After treatment, the rich solvent then flows out of scrubber 16 to be stored in a rich solvent storage system 32. In one embodiment shown in FIG. 2, the rich solvent storage system 32 includes at least a second storage tank 33.

Since the storage systems may be passive, the stored rich solvent may be safely held in storage system 32 for long periods of time, such as the time needed to restore operation of the primary gas treatment facility which may include a SRU or a restored geologic gas injection process. The rich solvent is a relatively harmless liquid of low vapor pressure and can be stored typically under atmospheric or low pressure, preferably with oxygen excluded. The affinity of the solvent for the sour gases keeps the reacted gas contaminants safely controlled at low or atmospheric pressure without need for complex cooling, control or additional compression systems or high pressure tanks. The stored rich solvent may also be stored in storage system 32 until phase separation of contaminants, such as liquid or entrained hydrocarbons, has occurred, allowing for recovery of contaminated solvents. Further, the intrinsic ability to store the rich solvent indefinitely allows the operator the capability to pretreat the solvent prior to regeneration, particularly when it the solvent absorbs other harmful contaminates contained in the supply of sour gas which are not readily able to be processed through simple or immediate regeneration. Such pretreatment processes may include cooling, aging, decantation, filtration, blending, or any other known method of neutralization or removal of contamination. The harmful contaminant so pretreated prior to regeneration may be any contaminant known to be present in crude or refined sour gas supplies.

Another substantial benefit of the configuration of the present auxiliary sour gas treatment system 10 is that it is readily scalable. For example, the running time of the present auxiliary system 10 may be expanded indefinitely simply by adding solvent storage capacity. Thus, the present auxiliary sour gas treatment system 10 may be configured to provide treatment of the supply of sour gas for a running time that meets or slightly exceeds the finite duration of the triggering event or the time needed for orderly shutdown of upstream equipment or for orderly startup of repaired or alternate facilities. Further, embodiments of the present auxiliary sour gas treatment system 10 may include one or more scrubbers 16, lean storage tanks 19, rich storage tanks 33, and a volume of lean solvent necessary to scrub contaminants from the sour gas for the desired running time for the desired volume and rate of gas to be treated. The storage components and the solvent delivery systems of the present auxiliary sour gas treatment system 10 may be configured to provide a longer treatment duration capacity or to provide higher flow rates to allow auxiliary system 10 to treat higher influent volumes of sour gas.

In a simple embodiment, only first tank 19 and second tank 33 or a single tank with two separate compartments (not shown) are utilized. In this embodiment, first tank 19 may be used exclusively to store lean solvent, and second tank 33 may be used exclusively for storing rich solvent. However, as also shown in FIG. 2, another embodiment of the present auxiliary system 10 incorporates a third storage tank 34. This embodiment includes two storage tanks 19 and 34 in the lean storage system 18 that store the lean solvent, and the combination of tank 33 and at least one of the other tanks, either 19 or 34, as the rich solvent storage system 32. For example tank 33, remains empty when the present auxiliary system 10 is in a stand-by mode during normal operation of the primary sour gas facility 100. When the system 10 is required to operate upon the occurrence of a triggering event, the lean solvent is removed from tank 19 wherein the resulting rich solvent returns to and is stored in the initially empty tank 33. Once first tank 19 is emptied, the present auxiliary system 10 draws lean solvent from third tank 34 and when second tank 33 is full, the rich solvent flow is diverted to and stored in first tank 19. This configuration (and similar variations) effectively doubles the treatment capacity of the system 10 of the present invention by simply adding one or more additional tank 34 and suitable piping and valving.

The flow of solvent to and from scrubber 16 is accomplished by a system of supply distribution pipes 36 and supply valves 38 that are readily devised by those versed in the art. Supply valves 38 may be a system of multiple two-port valves, one or more multi-port valves, or any combination thereof. Similarly, the capacity of the system 10 of the present invention may be increased by providing any number of additional tanks, wherein one empty tank is present in a stand-by mode and ready to receive the rich solvent resulting from the reaction of the lean solvent supplied by one of the lean solvent storage tanks. After all of the lean solvent is removed from one of the lean storage tanks, then the emptied lean storage tank may be used to subsequently store the rich solvent resulting from the scrubbing process. Thus, any number of tanks may be incorporated into system 10 of the present invention.

Solvent storage tanks used in the present auxiliary system 10, including tanks 19, 33 and 34 may be conventional tanks, floating roof tanks, or may be membrane tanks, such as those used for fuel and water storage. Tanks 19, 33 and/or 34 may be an atmospheric tank if suitably vented, minimizing costs, but may also be pressurized tanks which may mitigate need for routine venting. Tanks 19, 33 and/or 34 may be isolated from contact with oxygen to prevent adverse reactions, and may be padded with natural gas or an inert gas such as nitrogen for example, to exclude air or to provide pressure differential for pumping. However, even in the event the padding pressure is lost, the rich solvent does not create an imminent hazard. Displaced vent gases will normally be trivial in quantity, and may be flared, incinerated, safely vented at elevation, locally scrubbed, returned to the system scrubber, or returned to the source system as known in the art or as described herein.

Moreover, the invention encompasses a similar result accomplished by a single tank (not shown) having a separating membrane between the rich and lean storage compartments. The separating membrane may be a moving membrane (as in a piston), or a flexible internal membrane.

Alternatively the lean and rich solvent may be kept in a single vessel, separate from the scrubber, and by gently returning warmed, rich solvent to the upper liquid level of the vessel and withdrawing lean solvent from the bottom of the vessel, a very large fraction of the tank may be utilized as source of lean solvent before cross-contamination with rich solvent becomes a significant problem. A person of skill in the art will appreciate the numerous methods available to store and adequately separate the lean and rich solvent and all such known methods and those hereafter developed are intended to be within the scope of the present invention.

Since tanks 19, 33, and/or 34 may contain hazardous materials such as corrosive amines and amine-sulfides, the tanks may be located in a secondary containment area or a diked area to address potential spillage or leakage. The diked or containment tank area may be located as convenient for the user, such as adjacent to scrubber 16 or flare system 30 or, alternatively, more remotely on or off-site of the gas treatment facility. Another embodiment of the present auxiliary system 10 allows for transportation of the rich and lean solvents by pipeline, truck, rail car, or water-going vessel to remote processing facilities. The remote facilities may even be operated by others. The lean and rich solvent being at low pressure and relatively low toxicity are readily transported and stored, unlike the sour gas which requires immediate treatment and processing in complex facilities.

As shown in FIG. 2, the present auxiliary system 10 includes regeneration/reuse of the solvent wherein the rich solvent stored in the rich solvent storage system 32 is withdrawn therefrom through regenerator inlet pipe 40. The rich solvent is introduced into regenerator 42 wherein the rich solvent may be heated through a reboiler 44 and heated such that the previously reacted hydrogen sulfide is removed from the solvent as a reformed hydrogen sulfide gas and is regenerated into an enriched stream of a sour gas comprising the hydrogen sulfide. Other regeneration techniques now known or hereafter developed may also be incorporated depending on the solvent being employed. Notably, the regeneration step may be carried out at a time and rate convenient to the user, and may, but need not, be operated at the same time or even at the same site as the absorption step. Thus, in one embodiment of the present auxiliary system 10, the absorption step is decoupled from the regeneration step and the treatment capacity of auxiliary system 10 is independent of the regeneration capability or capacity of the primary or auxiliary system. This feature makes present auxiliary system 10 highly immune to temporary incapacities in the regeneration system or in the downstream treatment capability (e.g. the SRU and/or the tail gas treatment unit) of a primary gas treatment facility. The enriched stream of sour gas, containing hydrogen sulfide, is expelled from the regenerator through a regenerated gas outlet line 46 and may be directed toward an SRU or other disposal system or method. After the bound hydrogen sulfide is removed from the rich solvent, the solvent is regenerated into a "lean" state and may be conveyed back to the lean solvent storage system 18 to be ready for the next triggering event that necessitates the use of the present auxiliary sour gas processing system 10. The solvent may be taken out or put back into tanks 19, 33 and 34 using regeneration distribution piping system 50 using one or more valves 52 and driven by one or more pumps 54 to and from regenerator 42.

Figure 3:
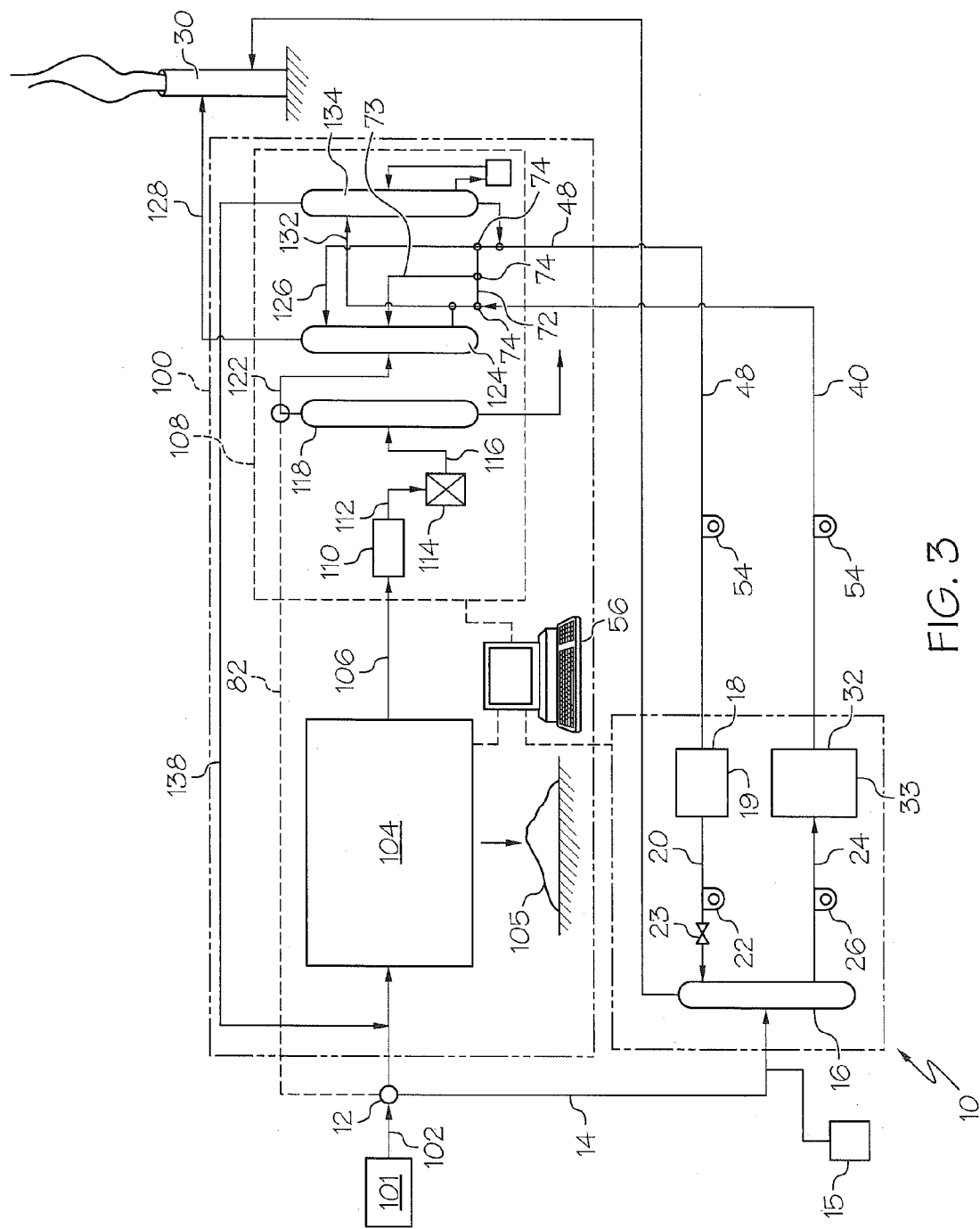
FIG. 3 is a schematic view of one embodiment of the present auxiliary sour gas treatment system in accordance with the teachings of the present invention as incorporated into the primary treatment facility of FIG. 1.

One embodiment shown in FIG. 3, includes the present auxiliary system 10 being connected to the existing regenerator 134 at the primary sour gas treatment facility 100, and regeneration of the rich solvent in storage tanks 33 and/or 34 occurs along with normal processing, making use of such excess capacity as exists at primary sour gas treatment facility 100 at any point in time. As shown, small pumps 54 may be used to convey the solvent to and/or from regenerator 134. Alternatively, the regenerator used may be one associated with a fuel gas treatment system typically upstream of sulfur recovery unit 104.

In the embodiment shown in FIG. 2, the present auxiliary sour gas treatment system 10 includes lean pump 22 and rich pump 26 being operable to propel the solvent through the system during the scrubbing phase. Pumps 22 and 26 are to be sized for the expected loads during scrubbing and may be fixed or variable speed. These pumps may be powered by electrical grid power or by other means, such as steam, gas or compressed air, or by engines in special circumstances. If electrical grid powered, they may be readily backed up by a small emergency electrical generator or backed up by fueled pumps, assuring availability during grid power outages. Gas or air powered pumps, if selected, may also utilize stored pressure systems for emergency operation.

In another embodiment of the present auxiliary system 10 (not shown), dependence on lean pump 22 in an emergency can be eliminated through use of pre-pressurized lean solvent storage system 18. Pressure can be provided by gas padding in lean storage tank 19, or by gravity systems from elevated tanks offering sufficient head pressure. As a person of skill in the art will readily appreciate, these variants usually require additional capital when compared with provision of simple backup power systems. The present auxiliary system 10 may also use gravity or available pressure feed to propel the rich solvent from the scrubber 16 to the rich storage system 32 in lieu of rich pump 26. As readily recognized in the art, a gravity feed is accomplished by locating scrubber 16 at an elevation sufficiently higher than the one or more rich storage system, for example tank 33. Similarly, pressure feed to the rich storage system 32 may be induced by operating the scrubber 16 at somewhat elevated pressure, as may readily be available in many sour gas supply situations.

Figure 4:
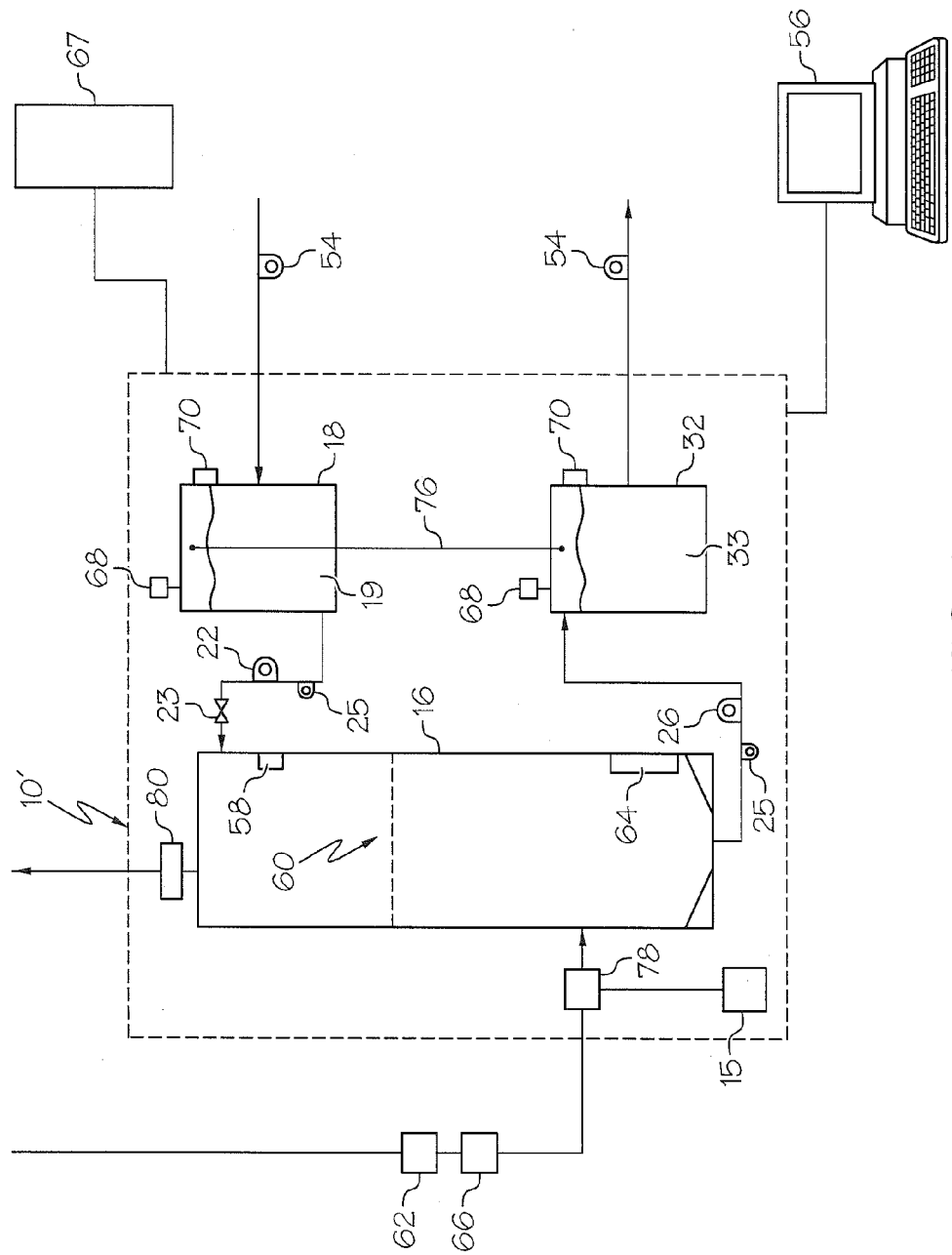
FIG. 4 is a schematic view of another embodiment of the present auxiliary sour gas treatment system in accordance with the teachings of the present invention.

The present auxiliary system 10 may also include a small flow of lean solvent being maintained or continuously cycled through scrubber 16 to keep surfaces wet and ready for service, or to scrub small routine quantities of gases. This small solvent flow may also be used advantageously to transfer heat to and from the storage systems 18 and 32, and to assure that the solvent in the system remains substantially of the same character as the solvent used in the primary sour gas treatment system in composition, strength, and other properties. The small standby flow may then be used advantageously as partial lean or semi-lean feed for the primary sour gas facility 100, as described above, thereby reducing utilities cost and eliminating loss of primary sour gas treatment facility 100 capacity, which would otherwise result from regenerating this continuous standby flow of essentially lean solvent. As shown in FIG. 4, the standby flow from scrubber 16 is typically moved by one or more small pumps 25 sized for the standby load, leaving the main scrubber pumps 22 and 26 free from wear for reliable use during triggering events.

Pressure feed of the rich solvent into the rich storage system 32 may be accomplished by maintaining scrubber 16 at a pressure sufficient to push rich solvent from scrubber 16 to the rich storage system, for example tank 33. Such pressure may be available when the sour gases to be scrubbed are piped to the primary sour gas treatment facility 100 at sufficient pressure. Where such pressure is available, it may be harnessed through use of a back pressure device (such as a control valve) on line 28. When optionally added pressure is used in scrubber 16, it may also contribute to and increase the effectiveness of the absorption process, thereby allowing a wider range of solvents to be used.

During the storage of rich solvent, no utilities are required and the present auxiliary system 10 is passive and stable over a wide range of temperatures and conditions for storage of an indefinite duration. However, in cases of extreme cold, some insulation and freeze-protection heating may be required to protect equipment. During the regeneration phase, which occurs at the convenience and discretion of the operator, such as during the triggering event or after the triggering event has been resolved, the present auxiliary system 10 may use small conventional pumps 54 powered by electric drives to convey the rich solvent and regenerated lean solvent between the storage tanks 19, 33 and/or 34 and the regenerator 42 as shown in FIG. 2 or regenerator 134 as shown in FIG. 3 or as semi-lean feed to the absorber 124 of the primary gas treatment facility 100, from which it will bind additional hydrogen sulfide, before flowing to the primary regenerator 134. Pumps 54 may include, but do not require, backup power since the regeneration of the solvent may be interrupted and re-established at any time at the operator's discretion. Thus, if a primary sour gas treatment system is operating a below peak capacity, regeneration of the auxiliary rich solvent may be performed and, if a sudden surge in supply results in the primary sour gas treatment system required to operate at or near its peak capacity, then the regeneration of the auxiliary solvent may be stopped and re-established when such surge diminishes.

As shown in FIG. 3, the present auxiliary sour gas treatment system 10 may also include a control system 56 in operable communication with one or more elements of the present auxiliary system 10 and/or the primary sour gas treatment facility 100. One embodiment of the present auxiliary system 10 is configured such that control system 56 is used to activate valves and/or pumps to convey and direct the solvent into scrubber 16, into and out of tanks 16, 33 and 34, through solvent distribution systems 36 and 50, and to and from the regenerator 134, and control system 56 may automatically respond to triggering events. Control system 56 may include a centralized computer, dedicated PLC, or a series of individually located microprocessors. Control system 56 may also be pneumatic or hydraulic. Manual controls are also within the scope of the present system. For reliability, controls for the present auxiliary system 10 are normally backed up through ordinary systems for supplying reliable instrument air and instrument power, readily supplied by existing "uninterruptable" systems. These back-up power systems may already be present on a user site and adapted to interact and control the present auxiliary system 10. In an embodiment of the present auxiliary system 10, all operations are supervised or controlled by an automated control system 56, which may include a computer, PLC and dedicated loop controllers, sensors, controls, and/or data logging. The associated controls and sensors may be controlled by control system 56 via wired or wireless communication. The present auxiliary sour gas treatment system 10 may be advantageously triggered into action by control system 56 through operator command, detection of changing operating conditions, such as, rising flow rates to the scrubber or rising flow or pressure in the pipes feeding the scrubber, excess pressure or flow in pipes feeding the sulfur recovery plant, detection of out-of-specification gases by process analyzers, detection of valve openings such as by switch or valve position, or according to scheduled maintenance and/or test runs. Such conditions may be determined by sensors placed throughout the primary sour gas treatment facility or upstream gas treatment facilities. A person of skill in the art will appreciate that such monitoring systems are well known and that the present auxiliary system may also be utilized beneficially when there is an anticipation of such conditions above, particularly when such sensors determine that there is a pending risk of one or more of the above triggering conditions occurring. Engaging the present auxiliary system shortly prior to the actual occurrence of the triggering condition may reduce the need for or impact of any transitional production slow-down and any actual loss of treatment capacity.

As best shown in FIG. 4, another embodiment of the present auxiliary system 10' includes an integrated system of sensors and controls controlled by control system 56. The present auxiliary system 10' may include a temperature sensor or differential temperature sensor 58 in scrubber 16 which monitors for increasing temperature changes proximate the lean zone 60 of scrubber 16. The temperature sensor 58 can be used to provide feedback to the operator or the control system 56 related to properly adjusting the incoming solvent flow to prevent sour gas break through. The temperature sensor 58 and similar temperature sensors (not shown) may also monitor the temperature differential across both the lean and rich zones. Alternatively, a sensor system may monitor the temperature differential in several zones, which provides the operator or the control system with more operating inputs. Excessive increases in the difference in temperature across the scrubber, or across portions of the scrubber, or migration of the temperature gradient toward the outlet of the scrubber are usefully indicative of inadequate lean solvent supply or flow rates due to an increase in reaction heat. Conversely, absence of significant and expected temperature differential is indicative of excessive solvent consumption, which will reduce operating run-time and increase operating expense for the present auxiliary system. A gas analyzer 62 may also be used to advantage to fine tune the solvent flow through feed-forward or feed-back control or both. Gas analyzer 62 may be used to sense the contaminant load of one or more contaminant in the gas and may be located either upstream of scrubber 16 (as shown) for feed forward control or downstream of scrubber 16 (not shown) for feed-back control of lean solvent flow to the absorber. Feed-forward control using analyzer 62 is best used in conjunction with a flow sensor, such as 66.

Control system 56 may include flow sensor 66 to measure the flow of the stream(s) of gases directed to the invention scrubber. The flow sensor 66 alone or in conjunction with the gas analyzer 62 may be used to monitor and control the flow of gas into scrubber 16, but may also be used to vary the feed of lean solvent into scrubber 16 to match the incoming, uncontrolled contaminant load. Flow of solvent may be measured for control by a flow sensor 21 after lean pump 22. Upon detection of the gas contamination and/or a change in the flow rate of the influent gas control system 56 may increase or decrease the speed of lean pump 22 or adjust variable flow valve 23 as shown in FIG. 4 and to assure an adequate flow rate of solvent into scrubber 16. The control system may also deem the appearance or disappearance of gas influent as "triggering events" to leave or enter standby or regeneration modes. Being able to accurately match the flow rate of lean solvent into scrubber 16 ensures proper contaminant removal from the subsequently flared cleaned gas and ensures the most efficient use of the fixed volume of lean solvent and influent sour gas contained in the lean solvent storage system 18, which also optimizes the treatment duration capacity of the present auxiliary system 10'. The flow rate of the lean solvent may be facilitated by a flow sensor 21 on the lean solvent in-flow pipe 20.

Control system 56 may include a level control device 64 at scrubber 16 which triggers the withdrawal of rich liquid from scrubber 16 to be conveyed (by pumping, pressure or gravity) to the rich tank storage system. Further, in FIG. 4, a standby power generator 67 assures power for the operation of pumps 22 and 26 when the triggering event includes a loss of utilities. As further shown in FIG. 4, as rich solvent flows to the rich solvent storage system 32, a crossover line 76 may allow displaced gas to flow into the emptying lean tank(s), and a pressure regulator 68 may be used to allow excess vapor to flow to the vent system, if needed, such as to (a) the lean tanks, (b) the facility flare, or (c) to a return line to scrubber 16, for example, directly or by a venturi device operating on the simultaneously flowing lean pump 22. Pressure relief devices and gas pad regulators (not shown) protect scrubber 16 and solvent storage systems 18 and 32 from catastrophic over or under pressure, as needed based on vessel pressure design. Highly concentrated sour gas streams may also benefit from introducing an intentional admixture of stabilizing gas (natural gas or inert gas) into the rich zone of a trayed or packed scrubber 16 or into scrubber 16 with the sour gas supply, which serves to prevent flow and level instability in such scrubber 16. Cooling of the solvent and/or higher scrubber pressures may be used to increase solvent capacity or efficiency or to improve the operation of rich pump 26. Control system 56 may include one or more automatic or manual fluid level sensors 70 in solvent storage systems 18 and 32 to provide the present auxiliary system 10' with inventory information and trigger the switching of tanks in a multi-tank system. As shown in FIG. 2, this feature allows the present auxiliary sour gas treatment system 10' to accommodate use of its tanks for both lean and rich solvent storage through the use of the distribution systems 36 and 50 (as shown on FIG. 2) and valve systems 38 and 52 and to decide which tanks store lean solvent, and which tanks store rich solvent at various times during the treatment process. Such tank control may be automated or manual. Control system 56 may control solvent flow using one or more control valves and/or by varying pump speeds to meet necessary flow requirements at a desired flow set point as determined by the operator, or by the control scheme itself. One embodiment employs ratio-control of solvent to gas flow, and another involves trim of such ratio flow control by means of analyzer(s) or temperature differential.

Now turning back to FIG. 3, control system 56 may also monitor and control the operation of small pumps 54 and flow controller to convey rich solvent back to a main plant regenerator 134 as desired by the user. In one embodiment of the present auxiliary system 10, this return flow in pipe 40 may be directed through a recycle pipe 72 by one or more valves 74 to be returned to the main plant scrubber 124 via lines 73 and/or mixed with lean solvent-in pipe 126. This configuration supplements the lean solvent cycling through the tail-gas treatment unit 108. Alternately the enriched solvent may be piped back to an absorber at another gas treatment facility 101 that may be upstream of primary sour gas treatment facility 100 (shown in FIG. 1 as a sulfur recovery plant), such other gas treatment facility 101 may be a fuel gas treatment facility or a natural gas treatment facility, or any other refining or sulfur recovery facility that includes an amine-based absorber and/or solvent regenerator which may process the same type solvent. The enriched solvent may be introduced into any absorber as a "semi-lean" flow to be used in amine-based sulfur removal. It is preferable that the same solvent is used in both processes. These options maximize the absorption capacity of the solvent by using the semi-lean solvent again in the tail gas treatment unit 108 absorber 124 of the primary sour gas treatment facility 100 or in an absorber at an upstream fuel gas treatment facility 101 prior to its regeneration. Alternatively, in another embodiment shown in FIG. 3, the rich solvent-in pipe 40 may be pumped directly into absorber 124 via lines 72 and 73 and one or more valves 74 without first being combined with the lean solvent-in pipe 126. This alternative allows the semi-lean solvent to be advantageously injected at an absorber location where the sour gas is rich, without unduly compromising absorber outlet concentration. The semi-lean solvent is preferably returned to the absorber at a "rich zone" through pipe 73 rather than with the lean solvent-in pipe 126. Alternately, suffering greater utility and capacity penalty, it may be simply directed to regenerator 134 through a valve 74 into line 132 without passing first through absorber 124. In another alternative, a person of skill in the art will appreciate that rich solvent-in pipe 40 may be in fluid communication with another sour gas treatment facility 101 and utilize an absorber and/or regenerator thereof for using or regenerating the rich solvent in further processing.

The present auxiliary sour gas treatment system 10 and 10' uses stored, pre-cooled solvent and allows for indefinite delays in regeneration and effectively decouples the absorption and treatment step from the solvent regeneration step. Therefore, to effective scrub sour gases, it does not require: (1) an operational backup process cooling system or complex heat exchange system to assure operability, (2) an operational "backup" SRU to accommodate brief periods of outage or limitation of the main SRU, (3) an operational "backup" amine regenerator, or (4) a regenerator system sized to operate at the peak absorption rate of the auxiliary scrubber. Thus, in a simple layout, the present auxiliary system 10 and 10' merely requires scrubber 16, lean storage system 18 and rich storage system 32 with distribution piping and sufficient pressure heads to convey the solvent from one element to the other. For occasional regeneration, auxiliary gas system 10 and 10' need only occasional access to unused regeneration capacity. Such capacity may, of course, be provided by a dedicated regenerator (42 in FIG. 2) but adequate unused capacity is generally available at most refineries either in an upstream fuel gas treating facility 101 or in a tail gas treating system 108.

The storage systems 18 and 32 may comprise one or more tanks used for lean storage, and one or more tanks for rich storage. Tanks for lean and rich solvent storage may be isolated from air contact to preserve the amine solvent from oxygen attack and may be capable of sustaining modest internal pressures (around 15 psig or a suitable design pressure) to assist in vapor management. However, the present auxiliary system 10 or 10' need not develop pressures this high at all. For example, one embodiment maintains a closed system with pressures of about 1 psig to about 5 psig. In such instance, the tanks are capable of pressure ranges such that normal tank breathing is accommodated internally by modest pressure swings and no venting occurs routinely. The tanks may also be vented to a flare system, incinerator or a scrubber to manage excess vapors if they occur. The tanks may be configured to maintain the solvent at suitable temperatures for the local climate. For example, in cold climates tanks may require insulation, tracing, or modest use of supplemental heating via standby circulation as described above to assure proper viscosity of the solvent for pumping and to prevent the solvent from freezing.

As shown in FIG. 4, a crossover line 76 in the preferred embodiment passively connects the vapor spaces of the lean and rich tanks to regulate the relative pressure and to accommodate gas displacement as one tank fills and another empties. Crossover line 76 acts to primarily equalize pressures between these tanks, assuring that minimal make up "pad" gas is needed and that minimal gas flows to flare 30 or 130 or scrubber 16 via pressure regulator/vents 68 and helps to protect the system from any malfunction of pressure regulator/vents 68. Since the flow of gases between the tanks is minimal, there is little or no significant contamination between the rich vapor and the lean solvent, even when the rich and lean solvents vapor spaces incur some passive contact. Crossover line 76 may also be physically configured to help prevent or manage tank-overfill. One embodiment includes a second crossover line (not shown) for liquids traffic configured similarly to cross over line 76, but as an underflow line connecting the bottom of the tanks and equipped with a control valve (not shown). During regeneration and circulation, the second crossover line is used to (1) maintain level control of the lean tanks during regeneration and standby circulation, (2) maintain level control of rich tanks during standby circulation, (3) completely purge rich amine from the rich tanks using lean amine during regeneration, and (4) allow continual standby circulation throughout the system.

As shown in FIG. 4, an embodiment of the present auxiliary system 10' includes a supply of sour gas flowing to scrubber 16 first passing through a liquids cooling and knock out vessel 78 to remove free liquids that might otherwise contaminate the solvent. Removed liquids may be diverted to a sour water system of a primary gas treatment facility. Similarly, vent gas from scrubber 16 preferably passes through a mist-elimination vessel 80 to control solvent losses prior to being flared. This recovered solvent may be returned to the system. These vessels 78 and 80 may be located outside scrubber 16 as shown or may be combined in the same container as scrubber 16. Additional components, such as heaters, coolers, tracing, insulation, sensors, analyzers, filters, screens, or other components not shown may be introduced and placed at any desired location within the present auxiliary system 10 or 10' to affect efficiency, enhance the performance of the auxiliary system, or as otherwise needed due to the selection of the solvent and the environmental operating conditions.

The system of the present invention 10 and 10' may include a skimming mechanism (not shown) for one or more the solvent tanks for removal of entrained liquid hydrocarbon floating at the solvent interface in the event of sour gas contamination by liquid hydrocarbon during a triggering event and/or may include a filtration mechanism (not shown) for the removal of solids or entrained hydrocarbons, for example in carbon beds. Tanks 19, 33, and 34 may be configured with a larger volume to facilitate adequate time for emulsion breaking, and may be used advantageously for this purpose, even by the primary plant system. As will be appreciated by those skilled in the art, the skimming mechanism may be assisted by level sensing and control features on the tanks.

In use, the present auxiliary sour gas treatment system 10 and 10' allow for the treatment of a supply of sour gas from an upstream refinery while a primary sour gas treatment facility 100 is offline, inoperable or incapable of treating the supply of sour gas. The present auxiliary sour gas treatment system 10 and 10' is configurable for use with a primary sour gas treatment facility 100, or portions thereof, to process sour gas or acid gas during a triggering event that may last for a number of hours, or configured for any reasonable desired run time and capacity. For example, a downstream SRU 104 may require that a first stage reactor be taken offline for around three hours to allow bypassing the reactor in order to carry out repairs or catalyst replacement. The auxiliary treatment system would, therefore, be sized to have storage and scrubbing capacity to allow for at least around three hours of run-time a present load. The period in which the primary sour gas treatment facility may be inoperable, offline, or incapable to process the supply of sour gas may have a finite duration of from about five minutes to extending for twenty-four hours or more, or even continuously in the case of a remotely operated auxiliary treatment system. However any duration of a triggering event is theoretically possible if a sufficient supply of solvent storage is maintained. For example, with the present system implemented, SRU 104 or other component of primary sour gas treatment system 100 can be shutdown, the reactor isolated through use of line blinds or other positive means, and the sulfur plant may be restarted within a number of hours with or without the repaired stage. The upstream equipment (e.g. the refinery) can continue to operate during this time and the refinery waste processed by the present auxiliary sour gas treatment system 10 and 10' during the downtime of the SRU 104 and/or a primary sour gas treatment facility 100. Once SRU 104 resumes operation, the stored solvent can then be regenerated at a rate and time convenient to the operator.

Thus, the present auxiliary system 10 and 10' may eliminate the need for the operator of a primary sour gas treatment facility to purchase and maintain a redundant SRU facility, particularly in the Claus section, to assure continuous operations, or to eliminate the alternative costs and risks of shut down of the entire refinery in order to perform necessary repairs to the primary sour gas treatment facility. Another application of the present auxiliary sour gas treatment system 10 and 10' may be engaged during surges of sour gas output by the upstream refinery to the primary sour gas treatment facility 100 when such surges exceed the available treating capacity of the primary sour gas treatment facility 100. The excess sour gases may be diverted to the present auxiliary sour gas treatment system 10 and 10' to assure continuous operation of the upstream refinery and the passive storage capability of the present auxiliary system 10 and 10' provides a decoupling of the absorption process and the regeneration process so that the excess supply of gas can be treated and the rich solvent produced can be processed in a controlled fashion in the future by the existing primary gas treatment facility's equipment when it is again otherwise operating at less than its full capacity. The auxiliary sour gas treatment system 10 and 10' may also be used to perform routine load-balancing, de-bottlenecking, and peak management, for example of diurnal peaks and valleys in processing by the refinery or the primary sour gas treatment facility.

As shown in FIG. 3, upon the occurrence of a triggering event, some or all of the sour gas influent from the upstream refinery is diverted by by-pass valve 12 into influent pipe 14. The sour gas is received into scrubber 16. Sour gas from an intermediate flow of sour gas such as prior to entering a tail gas treatment facility absorber 124 (shown in FIG. 1) from an SRU tail gas quench tower 118 may also be diverted to the present auxiliary system for treatment using suitable piping 82 if the tail gas treatment unit is off-line, inefficient, or inoperable. Similarly, the lean and rich storage accommodated in 19 and 33 may be used advantageously to accommodate temporary insufficiencies in regenerator 134 of the primary treatment system to mitigate excess emissions at stack 30 that would otherwise arise from such insufficiencies. Lean solvent is also conveyed into scrubber 16 from lean solvent storage system 18 through the lean solvent-in pipe 20 upon the occurrence of a triggering event, or it such flow may be initiated in advance in anticipation of the occurrence of a triggering event. Lean solvent may be pumped in using pump 22 or may alternatively be conveyed through pressure or gravity. Moreover, lean solvent-in pipe 20 may have a variable flow valve 23 operably connected thereto wherein valve 23 may be adjusted to vary the flow rate of solvent through lean solvent-in pipe 20. As solvent is withdrawn from the lean tank(s), a padding gas regulator (not shown) may admit gas to the lean tanks to prevent low pressure and inflow of oxygen from the air or vent system into the tank and/or to maintain pad pressure. Additionally or alternately, as shown in FIG. 4, a gas crossover line 76 can allow gas to flow between the vapor spaces of tanks 18 and 32.

An embodiment of the present auxiliary sour gas treatment system 10 and 10' utilizes an amine solvent already in use at the site, such as MEA, MDEA, or DEA solution in water. As the lean solvent comes into physical contact with the sour gas in scrubber 16, the contaminants in the sour gas are removed in a mass-transfer of the sour gas components (sulfur and/or carbon dioxide) into the lean solvent at which time the solvent becomes "rich" due to the hydrogen sulfide and other contaminants being chemically or physically bound in the solvent. As described above, one or more sensors and control system 56 may be used to monitor the flow and/or concentration of the sour gas and/or outlet gas, and/or the temperature differential or reaction heat of the system and adjust the inflow of the lean solvent to provide optimized reactive capacity.

The scrubbed clean gas then exits scrubber 16 where it is conveyed to the flare tower 30 (see FIG. 2) or 130 (see FIG. 3) and burned off or otherwise disposed or captured for use as a fuel or other use. The rich solvent that contains the bound contaminants is removed from scrubber 16 and conveyed to rich solvent storage system 32. As shown in FIG. 4, one or more sensor 64 may be integrated into scrubber 16 to trigger operation of output pump 26 to convey rich solvent from scrubber 16 to storage system 32, such as tank 33. Once the rich solvent reaches the storage system 32, it can be held indefinitely to be regenerated when primary sour gas treatment facility 100 is operating at less than full capacity or otherwise at an operator's discretion. As shown in FIG. 3, a small return pump 54 and flow controller (not shown) are activated to withdraw rich solvent from a rich solvent storage system 32 and convey the rich solvent to the existing plant absorber 124 or regenerator 134. Alternatively, as shown in FIG. 2, the present auxiliary system 10 may also include a dedicated regenerator 42 for removing the absorbed components from the rich solvent and returning the regenerated lean solvent to the lean solvent storage system 18. This alternative would be desirable primarily in special cases such as those where the auxiliary system solvent composition must be different from the composition of the solvent used in regeneration systems routinely operating at the refinery.

Now turning back to FIG. 3, one embodiment includes the rich solvent from rich storage system 32 being diverted to the existing plant absorber 124 by valves 74 and pipe 72 to be introduced into absorber 124 by pipe 73 at a location lower that the lean solvent from pipe 126 as shown. Another embodiment includes the rich solvent being directed into pipe 126 and mixed with lean solvent to be conveyed into absorber 124. The semi-lean solvent material from the present auxiliary system 10 should be capable of binding additional sour gas contaminants until it is more optimally saturated, thereby reducing the need for additional lean solvent to be supplied to absorber 124 or for such additional solvent to be regenerated at regenerator 134. These configurations save both the capacity and operating costs of the utilities for primary sour gas treatment facility 100. The saturated rich solvent will exit absorber 124 and flow to the regenerator 134 according to typical operation. Alternatively, the operator may simply direct the rich or semi-lean material directly to regenerator 134, forgoing these potential savings.

In any event, the regenerator used (regenerator 42, 134, or at an upstream fuel gas treatment plant not shown) removes the absorbed contaminants from the rich solvent to result in reproducing a pure (as opposed any sour gas received that is out of specification) enriched sour gas and rendering the solvent in a lean state. The regenerated lean solvent subsequently may be cooled by the regenerator equipment. Excess regenerated lean solvent returns to lean solvent storage system 18, for example replenishing first tank 19. Pump 54 may be used to return the lean solvent to lean solvent storage system 18. Return of the lean solvent may be facilitated by use of control system 56 and a level control based on the primary gas treatment facility's surge vessel, primary reboiler, or primary absorber, depending upon the design of the primary gas treatment facility. The enriched stream of sour gas that is produced during regeneration in regenerator 42 or 134 is directed back to be mixed into the influent sour stream being treated by primary sour gas treatment facility's SRU 104, a sulfuric acid unit, a unit producing sulfites or thiosulfates, or to an acid gas geo injection plant (not shown). The SRU 104 turns the enriched stream of sour gas in to elemental sulfur, which is a marketable product. A configuration of the present auxiliary system 10 and 10' allows the rate of regeneration of the rich solvent to be at the discretion of the operator and, therefore, may only be a small fraction of the total regenerator load thereby utilizing the existing unused treatment capacity that is almost always present at various times during the normal operation of the primary sour gas treatment facility 100. Such unused capacity, of course, may also exist at a regenerator of an upstream sour fuel gas treatment facility 101 (shown in FIGS. 1 and 3), such as a fuel gas treatment facility or a natural gas treatment facility, or any other amine-based absorber at a refinery or sulfur recovery plant. The regeneration rate of the stored rich solvent, however, may also be varied to match the availability of rich pumping and the unused regeneration capacity of primary gas treatment facility 100 and any unused SRU 104 capacity.

For example, one embodiment of the present auxiliary sour gas treatment system 10 and 10' may be configured for about a four-hour scrubbing event at high treatment rates that may be followed by a regeneration event that is spread out over several days to accommodate fitting the regeneration of the rich solvent at a primary sour gas facility's 100 regenerator 134 into regular production schedules and unit capacities. In addition, regeneration may be delayed indefinitely, and when performed, only needs to consume a small percentage of the plant's primary capacity. This ability may be used advantageously when the returned solvent is overly contaminated with deleterious materials such as entrained hydrocarbons wherein the rate may be limited to the ability of the gas treatment facility or the primary sour gas SRU to handle these unwanted materials through dilution, blending, pretreatment or other method. In other cases, the present auxiliary system 10 and 10' may be used, for example, to smooth diurnal loading of primary sour gas operations wherein the present auxiliary system 10 and 10' is used and the rich solvent may be regenerated on a regular "off-peak" basis, for example, daily.

Regeneration of the stored rich solvent may be slowed or stopped at any time to accommodate main processing schedules of the gas treatment facility, and then resumed when processing capacity is again unused. Similarly, if instantaneous treatment loading of the primary sour gas treatment facility is excessive during processing, even excess solvent of the primary gas treatment facility 100 may be stored in rich solvent storage systems 32 for later regeneration. This makes optimal use of existing capital, which results in a very cost efficient system which realizes benefits that are not possible with each system individually. Alternatively, at higher capital and operating costs, a separate regeneration system or extra capacity specifically intended for the present auxiliary sour gas treatment system may be included. In either case, some or all of the regenerated lean solvent is returned to lean storage system 18 free of its load of the sulfur compounds removed from the sour gas in the present auxiliary system 10. In addition, a separate SRU may be included in the present auxiliary system 10 and 10', but a separate SRU would require a substantial additional capital investment for little or no benefit.

Thus, utilizing the present auxiliary sour gas treatment system 10 and 10', the treatment regeneration and primary sour gas processing occurs at a time convenient to the operator, for example, when excess capacity is available in the regenerator of the primary sour gas treatment facility. Thus, actions necessary to repair or maintain the existing SRU or regeneration system may occur while the present auxiliary sour gas treatment system 10 and 10' operates, and the regeneration of the solvent and SRU processing of the captured sulfur can be delayed until a time convenient for the operator. This avoids having to flare sour gases directly into the atmosphere or shutting down the upstream production or refining. Because the present auxiliary system 10 and 10' is easily scalable, the repair time window or treatment duration afforded by the present auxiliary sour gas treatment system 10 and 10' is limited only by the size of solvent storage provided.

Figure 5:
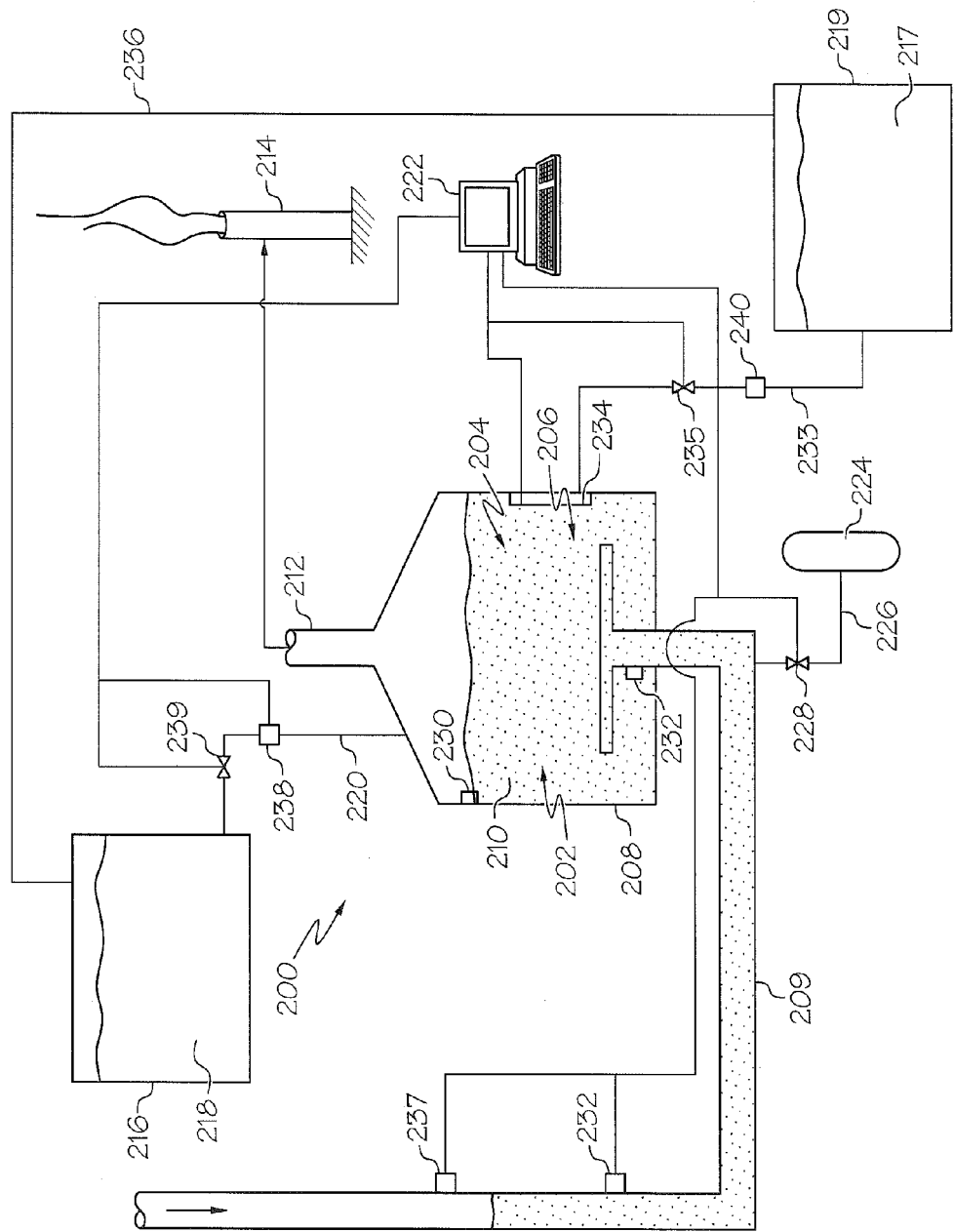
FIG. 5 is a schematic view of another embodiment of the present auxiliary sour gas treatment system in accordance with the teachings of the present invention.

In another simple form, the "scrubber" may be a tank in which the gas is simply bubbled through or otherwise contacted with the stored solvent, such as in a flare "water seal", or "liquid seal" often found at flare facilities. FIG. 5 illustrates another embodiment of the present auxiliary system 200 wherein a scrubber/contactor 202 and the lean solvent storage 204 and rich solvent storage 206 are contained in a single vessel 208. Sour gas enters single vessel 208 through an inflow pipe 209, which ideally is arranged such that when liquid level in the inflow pipe is above a certain level, the liquid "seals" the pipe, and when gas pressure displaces the liquid downward in the inflow pipe, a level sensor 232 can detect it, and the gas enters the vessel 208 under the surface of the liquid in the vessel. If the sealing liquid is a suitable absorbing solvent such as an amine, the sealing vessel can also act to clean the gas passing through it. The solvent 210 and gas are brought to intimate contact using one or more means of injection, sparging, spraying, baffles or plates, and the cleaned gas exits vessel 208 out effluent pipe 212 to a facility flare 214 or otherwise disposed through a vent or incinerator. The cleaned gas may be a fuel product and in some embodiments, may contain less than 500 ppm of hydrogen sulfide or (even when ppm concentrations are higher) may contain so little hydrogen sulfide by mass as to release less than a regulated mass of sulfur oxides upon combustion per unit of time depending upon the then-current regulations. The system may be scaled to obtain the desired results and may be set up in series of stages to increase the contaminant removal efficiency. The present auxiliary system 200 may also include an external supplemental lean solvent storage system 216 containing a volume of supplemental solvent 218. The volume of solvent 210 contained in vessel 208 may be selectively adjusted to provide additional treatment capacity by introducing supplemental solvent 218 from external supplemental solvent storage system 216 into vessel 208 through a supplemental solvent feed pipe 220, and removed to supplemental external storage by a rich drain line 233 wherein the flow is controlled through a flow meter or flow valve 235. Supplemental solvent 218 may be added or removed from vessel 208 using pressure, gravity, and/or one or more pumps, and regulated either manually or automatically based on one or more operating conditions as described below. The vapor spaces of supplemental supply 216 and removal 219 tanks may be vented to the vapor space of the vessel 208 if desired to facilitate liquid flow, or may be cross-connected 236 to vent primarily to each other, if desired, since the displaced volumes of gas are approximately equal.

The flow rate of the supplemental solvent 218 at which supplemental solvent 218 is introduced into said vessel 208 may be manually or automatically controlled using control system 222 as similarly described above. Control system 222 may add supplemental solvent 218 into vessel 208 via valve 239 and line 220 in response to measurement of one or more operating parameters including flow set point, influent gas concentration, effluent gas concentration, solvent saturation, reaction heat, influent gas flow, and contaminant mass flow into or out of said scrubber that are measured by a plurality of sensors that may be distributed through the present auxiliary system 200. Flow meters 238 may be operably connected along line 220 and a flow meter 240 may be operably connected to line 233 to measure flow therein. Such a system may also incorporate the ability to remove "spent" or "rich" solvent 206 in vessel 208 to a volume of rich solvent 217 in an external rich solvent storage system 219 thereby preventing overfill of vessel 208 and preventing excessive back pressure against incoming line 209. The use of supplemental supply and rich storage tanks can effectively delay exhaustion of the solvent in the overall system, and can allow existing flare water seals to be converted to a simple auxiliary sour gas system of considerable capability. A person of skill in the art will appreciate that a configuration of vessel 208 will allow the present system 200 to also perform as a flare water seal device. One embodiment includes allowing an existing flare water seal to function as a an auxiliary scrubber system by substitution of a selective, regenerable solvent for the traditional water, oil, or antifreeze contents of said water seal, and provision of means to regenerate said solvent from time to time. Moreover, auxiliary system 200 functioning as a liquid seal may be used in combination with auxiliary system 10 or 10' as described above as the totally passive and instantly available nature can be used to an operator's advantage.

In the present auxiliary system 10, 10' or 200, stability in a trayed or packed scrubber/contactor 16, or in a sparged contactor 202 may be maintained by introducing a flow of stabilizing inert or hydrocarbon gas 15 into the rich zone of scrubber 16, 202 separately as shown in FIG. 2 or along with the incoming sour gas line 14 as in FIG. 3 or in line or 209 as shown in FIG. 5. As shown in FIG. 5, one embodiment includes stabilizing gas entering line 209 via line 226. In this embodiment, the supply of stabilizing gas may be regulated by a regulation device or valve 228 in operable communication with control system 222 (similar to element 56 in other embodiments). Stabilizing gas is useful for treating extremely concentrated sour gases, and the supply may be backed up by optional storage tank 224 or other reliable means. A person of skill in the art could readily incorporate stabilizing gas into auxiliary system 10 or 10' in a similar manner. For example, as shown in FIG. 2, stabilizing gas could be introduced from stabilizing gas source 15 into a "rich area" of scrubber 16; or as shown in FIG. 3, stabilizing gas from gas source 15 could be introduced into incoming sour gas line 14; or as shown in FIG. 4, stabilizing gas from gas source 15 could be introduced into knock-out vessel 78. A person of skill in the art could readily incorporate and combine any or all of the features described above to introduce stabilizing gas into the present auxiliary system in a number of ways.

In one embodiment tank 208 may include a solvent level control sensor 230 wherein the control system 222 may control the solvent level by allowing flow from supplemental lean solvent storage tank 216 into tank 208 thereby replenishing the volume of enriched solvent that is leaving through drain line 233 to be stored in the rich tank 219. Another flow sensor 237 and/or level sensor 232 on inlet pipe 209 may determine the presence or possibility of sour gas flow and may be in communication with control system 222. Further, a temperature sensor array 234 may be disposed on tank 208 in the liquid and may reference lean inlet 220 wherein control system 222 may respond to temperature rise (reaction heat release) to determine when to add more lean solvent 218 from supplemental lean tank 216 via line 220 wherein control system may control the flow by selectively opening valve 239 and monitoring the flow with flow meter 238. The external tanks 216 and 219 may be vented or padded. As mentioned above, the vapor spaces of the tanks may be in fluid communication with the vapor space of vessel 208 (not shown) or may be in fluid communication with each other through vapor cross-connection line 236 as shown in FIG. 5). One configuration may result in a system that uses a flow-meter 238 on line 220 from the supplemental lean tank 216 to the seal vessel 208 and a level sensor 230 on the seal to control the fluid outlet flow to the receiving rich tank 219. The system may be controlled to turn over the solvent contents fast enough to keep the accumulated heat of reaction under an empirically determined temperature. The rate of inflow may be further optimized by reference to a gas flow meter 237 on inflow line 209 to maintain an adequate ratio of lean solvent as measured by the flow meter on line 220 to incoming gas in line 209. Further, as shown in FIG. 5, the present auxiliary system 200 may, and generally will, use an inlet pipe elevation above the water seal level to prevent back-suck of amine solvent into the flare header by means of barometric sealing. Lean solvent is supplied from time to time to replenish vessels 208 and 216 via lines from a plant regenerator system. Rich solvent accumulating in vessel 208 and 219 is transferred from time to time to a plant regenerator via a line not shown. One embodiment includes a combination of auxiliary systems shown in FIGS. 2-5 wherein the system uses a lean solvent feed going to the vessel 208 used as a flare liquid seal during normal operation of a primary sour gas treatment facility and then uses the same lean solvent feed directed to scrubber 16 of auxiliary system 10 or 10' upon the occurrence or in anticipation of a triggering event.

Another embodiment (not shown) includes scrubber/contactor 16, 202 being partially or fully replaced by a liquid powered gas ejector system in which the motive liquid for the ejector is the pumped solvent, coming from a substantial stored supply of lean solvent, and the gas supply for the ejector is a low pressure or negative pressure source of gas such as a flare header. In this embodiment, cleaned, non-absorbed gases return to the flare system or, alternatively, they may be further compressed and returned to the refinery fuel gas system. In such cases, however, as with the other cases which practice the present invention, the enriched solvent is collected and stored until such time as regeneration is convenient. This is unlike typical flare gas recovery systems that require continuous regeneration and simultaneous primary sour gas processing capability such as in a sulfur recovery plant or geo-injection.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

I claim:

1. A primary sour gas treatment system having a plurality of processing steps, said primary sour gas treatment system being operable for removing one or more contaminants from a supply of sour gas, said one or more contaminants including hydrogen sulfide, said primary gas treatment system comprising an absorber, a regenerator in fluid communication with said absorber, and a volume of a regenerable primary solvent cycling substantially continuously through said absorber and said regenerator,
   wherein said supply of sour gas enters said absorber and wherein said regenerable primary solvent in a lean state contacts at least a portion of said supply of sour gas in said absorber and either chemically or physically binds some of said hydrogen sulfide in said regenerable primary solvent thereby resulting in said regenerable primary solvent being in a rich state and a cleaned gas suitable for one of incineration, venting, flaring, and capturing for use as a fuel,
   and wherein said primary gas treatment system cycles said regenerable primary solvent in said rich state to said regenerator wherein said regenerator removes said hydrogen sulfide from said regenerable solvent resulting in an enriched sour gas stream suitable for one or more further processing methods and said regenerable primary solvent in said lean state that is cycled back to said absorber,
   said primary gas treatment system having a maximum sour gas treatment capacity, said supply of sour gas and said enriched sour gas stream having one or more chemical and material properties, said one or more chemical and material properties having one or more variances, and wherein said primary sour gas treatment system having one or more limits on the capability to treat said one or more variances of said one or more chemical and material properties,
   the improvement comprising:
      an auxiliary sour gas treatment system in fluid communication with said primary gas treatment system to treat a diverted sour gas stream during a time period when one of said processing steps or said further processing methods are one of: inoperable due to an utility outage, upset due to start-up, shut-down or malfunction of said primary gas treatment system, insufficient, out of sequence, mismatched, outside regulation limits, and incapable of treating said portion of said diverted sour gas stream due to said one or more variances of one of said chemical and said material properties exceeding said one or more limits on the capability of said primary sour gas treatment system to treat said one or more variances, wherein said diverted sour gas stream comprises one of a portion of said supply of sour gas and a portion of said enriched sour gas stream.

2. The primary sour gas treatment system of claim 1 wherein said auxiliary sour gas treatment system comprises a lean solvent storage system and a scrubber in fluid communication with said lean solvent storage system and said diverted sour gas stream, said lean solvent storage system operable for storing a volume of an auxiliary solvent in a lean state wherein said volume of said auxiliary solvent is adequate for treating said diverted sour gas stream in said scrubber for said time period wherein said time period is at least ten minutes.

3. The primary sour gas treatment system of claim 2 wherein said auxiliary sour gas treatment system further comprises a lean solvent delivery system to deliver at least a portion of said volume of said auxiliary solvent in said lean state to said scrubber on demand for treatment of said diverted sour gas stream.

4. The primary sour gas treatment system of claim 3 wherein said lean solvent delivery system is operable to deliver said auxiliary solvent in said lean state to said scrubber during a utility outage.

5. The primary sour gas treatment system of claim 2 wherein said auxiliary sour gas treatment system further comprises a rich solvent storage system in fluid communication with said scrubber, said rich solvent storage system operable to receive and store said volume of said auxiliary solvent in an enriched state after treatment of said diverted sour gas stream in said scrubber.

6. The primary sour gas treatment system of claim 5 wherein the auxiliary sour gas treatment system is operable to treat of said diverted sour gas stream a portion of said time period without simultaneously regenerating said portion of said volume of auxiliary solvent in said enriched state, said portion of said time period being at least ten minutes.

7. The primary sour gas treatment system of claim 5 wherein said portion of said volume of auxiliary solvent in said enriched state may be stored indefinitely in said rich solvent storage system so that said auxiliary solvent in said enriched state may be regenerated at any discretionary time and at any discretionary rate of regeneration.

8. The primary sour gas treatment system of claim 7 wherein said discretionary rate of regeneration corresponds to any unused treatment capacity of one of said regenerator of said primary sour gas treatment system and a regenerator of another sour fuel or gas treatment facility at said discretionary time.

9. The primary sour gas treatment system of claim 7 further comprising said solvent in said enriched state being conveyed to one of said regenerator of said primary sour gas treatment system and a regenerator of another sour fuel or gas treatment facility from said rich solvent storage system by one of vessel, rail, truck, water-going vessel, tankers, and pipeline.

10. The sour gas treatment system of claim 5 wherein said auxiliary sour gas treatment system is operable to pretreat said portion of said volume of auxiliary solvent in said enriched state prior to said auxiliary solvent in said enriched state being regenerated.

11. The primary sour gas treatment system of claim 2 wherein said primary solvent and said auxiliary solvent are the same, said solvents selected from a group consisting of MEA, MDEA, DEA, DIPA, DGA, water, and any combination thereof.

12. The primary sour gas treatment system of claim 1 wherein said further processing method of said an enriched sour gas stream includes one of converting said hydrogen sulfide component into a marketable product through delivery of said enriched sour gas stream to a sulfur recovery unit, a sulfuric acid unit, a unit producing sulfites or thiosulfates, and disposing of said hydrogen sulfide component to a gas geo injection plant.

13. The primary sour gas treatment system of claim 12 further comprising said auxiliary sour gas treatment system being operable to treat said diverted sour gas stream during a time period when one or more of said further processing methods is inadequate, impaired or inoperable.

14. An auxiliary sour gas treatment system operable to treat a stream of a sour gas comprising:
  an influent supply of a sour gas, said sour gas comprising one or more contaminants, said contaminants comprising hydrogen sulfide;
  a lean solvent storage system for storing a volume of a regenerable solvent in a lean state;
  a scrubber in fluid communication with said supply of said sour gas and said lean solvent storage system wherein said scrubber receives said sour gas and said solvent in a lean state upon the occurrence or in anticipation of a triggering event, wherein said solvent in a lean state removes one or more contaminants from said sour gas by one of chemically and physically binding said contaminant in said solvent, thereby resulting in said solvent being in an enriched state and a cleaned gas suitable for one of incineration, venting, flaring, use as a fuel, further refining;
  a rich solvent storage system in fluid communication with said scrubber, said rich solvent storage system operable to store said solvent in said enriched state indefinitely during and after treatment of said sour gas in said scrubber until said solvent in said enriched state is to be regenerated; and
  wherein said triggering event is a time period when one or more processing steps are, or are at risk of becoming, one of inoperable due to an utility outage; upset due to start-up, shut-down or malfunction of said primary gas treatment system or other equipment; insufficient; out of sequence; mismatched; outside regulation limits; or otherwise incapable of treating said portion of said supply of sour gas due to one or more variances of one of a chemical property and a material property of said sour gas exceeding one or more limits on the capability of a primary sour gas treatment system to treat said one or more variances.

15. The auxiliary sour gas treatment system of claim 14 further comprising a lean solvent conveyance system to provide a flow of a portion of said volume of said solvent in said lean state from said lean solvent storage system to said scrubber on demand, and a control system operable to vary said flow of said solvent in said lean state into said scrubber in accordance with demand.

16. The auxiliary sour gas treatment system of claim 15 wherein said flow of said portion of said volume of said solvent in said lean state into said scrubber is varied based upon the measurement of at least one operating parameter selected from the group consisting of flow set point, reaction heat, temperature rise, sour gas density, a gas flow rate into scrubber, a gas flow rate out of scrubber, an inlet contaminant concentration, an outlet contaminant concentration, and contaminant mass flow.

17. The auxiliary sour gas treatment system of claim 14 further comprising a solvent regenerator operable to receive said solvent in said enriched state, remove said one or more contaminant from said solvent in said enriched state to regenerate said solvent into said lean state.

18. The auxiliary sour gas treatment system of claim 17 wherein said solvent regenerator is in fluid communication with said lean solvent storage system and said rich solvent storage system and said solvent regenerator is a component in a primary gas treatment facility selected from a group consisting of a fuel gas treatment facility, a natural gas treatment facility, and a tail gas treatment unit.

19. The auxiliary sour gas treatment system of claim 17 wherein said solvent in said enriched state is conveyed from said rich solvent storage system to said solvent regenerator by one of vessel, rail, truck, barges, tankers, and pipeline.

20. The auxiliary sour gas treatment system of claim 14 wherein a volume of at least one inert stabilizing gas introduced into a rich zone of said scrubber.

21. The primary sour gas treatment system of claim 7, wherein said auxiliary sour gas treatment system further comprises:
  said scrubber, said volume of said auxiliary solvent, said lean solvent storage system, and said rich solvent storage system are contained in a single vessel.

22. The primary sour gas treatment system of claim 1 further comprising: said rich solvent storage system in fluid communication with one of said absorber of said primary gas treatment system, or an absorber of another sour fuel or sour gas treatment facility.

\* \* \* \* \*